(12) United States Patent
Sturtevant et al.

(10) Patent No.: US 6,509,084 B2
(45) Date of Patent: *Jan. 21, 2003

(54) THERMOPLASTIC PRODUCTS HAVING ANTISLIP SURFACES

(75) Inventors: Thomas M. Sturtevant, South China, ME (US); Edward E. Cullivan, Palermo, ME (US)

(73) Assignee: Custom Plastics Molding, Inc., Benton, ME (US)

( * ) Notice: Subject to any disclaimer, the term of this patent is extended or adjusted under 35 U.S.C. 154(b) by 48 days.

This patent is subject to a terminal disclaimer.

(21) Appl. No.: 09/779,059

(22) Filed: Dec. 5, 2000

(65) Prior Publication Data

US 2001/0046588 A1 Nov. 29, 2001

Related U.S. Application Data

(63) Continuation of application No. 08/850,269, filed on Apr. 29, 1997, now abandoned, and a continuation-in-part of application No. 08/776,478, filed as application No. PCT/US95/09193 on Jul. 19, 1995, now Pat. No. 5,858,508, said application No. 08/850,269, is a continuation-in-part of application No. 08/282,219, filed on Jul. 28, 1994, now Pat. No. 5,648,031.

(51) Int. Cl.$^7$ .................................................. D06N 7/04
(52) U.S. Cl. ........................ 428/141; 15/215; 296/39.1; 296/39.2; 296/39.3; 428/143; 428/147; 428/409
(58) Field of Search ................................. 428/141, 143, 428/147, 409; 296/39.1, 39.2, 39.3; 15/215

(56) References Cited

U.S. PATENT DOCUMENTS

| | | |
|---|---|---|
| 73,919 A | 1/1868 | Newton |
| 1,411,912 A | 4/1922 | Fisher |
| 1,657,687 A | 1/1928 | Schuler |
| 2,120,406 A | 6/1938 | Hansen |

(List continued on next page.)

FOREIGN PATENT DOCUMENTS

GB 850791 10/1960

OTHER PUBLICATIONS

Materials Handbook, 12th Edition, McGraw–Hill Book Company, George S. Brady, Materials, Their Properties and Uses, pp. 406, 407 (1986).
Modern Plastics Encyclopedia 1988, McGraw–Hill Inc., Oct. 1987, vol. 64, No. 10A, pp. 356, 357, "Printing", Hans Deamer.

*Primary Examiner*—Nasser Ahmad
(74) *Attorney, Agent, or Firm*—W. F. Fasse; W. G. Fasse

(57) ABSTRACT

Thermoplastic products such as vehicle cargo area liners, floor mats, recreational and playground equipment, cargo pallets, and wet area walking surfaces are provided with an antislip surface treatment. The antislip surface is made up of individual non-interconnected asperities of an antislip polymer material, which do not form a continuous film over the surface of the thermoplastic product. The thermoplastic product is especially made of high density polyethylene. The antislip polymer is preferably a thermoset polymer, and most particularly is a polyurea/isocyanate polymer. The antislip polymer is preferably applied by spraying, and then the product is heat treated at a temperature in the range from 100 to 200° F., or is thermoformed at a temperature in the range from 250 to 550° F. The antislip asperities are durably bonded onto the thermoplastic base material, and provide a significantly increased coefficient of friction. The asperity size, height, and hardness can be controlled by adjusting the processing conditions. The asperities may have an increased surface relief due to a so-called "moth effect" and an increased surface roughness due to cratering as a result of a so-called "volcano effect" in the process using thermoforming.

20 Claims, 10 Drawing Sheets

U.S. PATENT DOCUMENTS

| | | | |
|---|---|---|---|
| 2,576,290 A | 11/1951 | Fisher, Jr. | |
| 2,793,136 A | 5/1957 | Root | |
| 3,124,807 A | 3/1964 | Frenkel et al. | |
| 3,148,103 A | 9/1964 | Gallagher | |
| 3,450,563 A | 6/1969 | Krueger | |
| 3,573,155 A | 3/1971 | Mitchell | |
| 3,598,677 A | 8/1971 | Bergmeister et al. | |
| 3,629,051 A | 12/1971 | Mitchell | |
| 3,629,380 A | 12/1971 | Edwards | |
| 3,878,147 A | 4/1975 | Craven | |
| 4,051,787 A | 10/1977 | Nishitani et al. | |
| 4,109,041 A | 8/1978 | Tellman | |
| 4,196,259 A | 4/1980 | Augustin et al. | |
| 4,329,312 A | 5/1982 | Ganz | |
| 4,414,316 A | 11/1983 | Conley | |
| 4,420,513 A | 12/1983 | Coke et al. | |
| 4,488,918 A | 12/1984 | Jofs | |
| 4,501,783 A | 2/1985 | Hiragami et al. | |
| 4,592,583 A | 6/1986 | Dresen et al. | |
| 4,614,686 A | 9/1986 | Coke et al. | |
| 4,692,370 A | 9/1987 | Reckziegel et al. | |
| 4,693,507 A | 9/1987 | Dresen et al. | |
| 4,721,641 A | 1/1988 | Bailey | |
| 4,745,139 A | 5/1988 | Haasl et al. | |
| 4,760,103 A | 7/1988 | Kraft et al. | |
| 5,053,253 A | 10/1991 | Haenggi et al. | |
| 5,094,902 A | 3/1992 | Haenggi et al. | |
| 5,110,657 A | 5/1992 | Ainslie | |
| 5,194,194 A | 3/1993 | Kato et al. | |
| 5,204,159 A | 4/1993 | Tan | |
| 5,263,761 A | 11/1993 | Hathaway et al. | |
| 5,290,591 A | 3/1994 | Lussi et al. | |
| 5,370,436 A | 12/1994 | Martindale et al. | |
| 5,494,729 A | 2/1996 | Henry et al. | |
| 5,578,362 A | 11/1996 | Reinhardt et al. | |
| 5,858,508 A * | 1/1999 | Sturtevant | 428/147 |

* cited by examiner

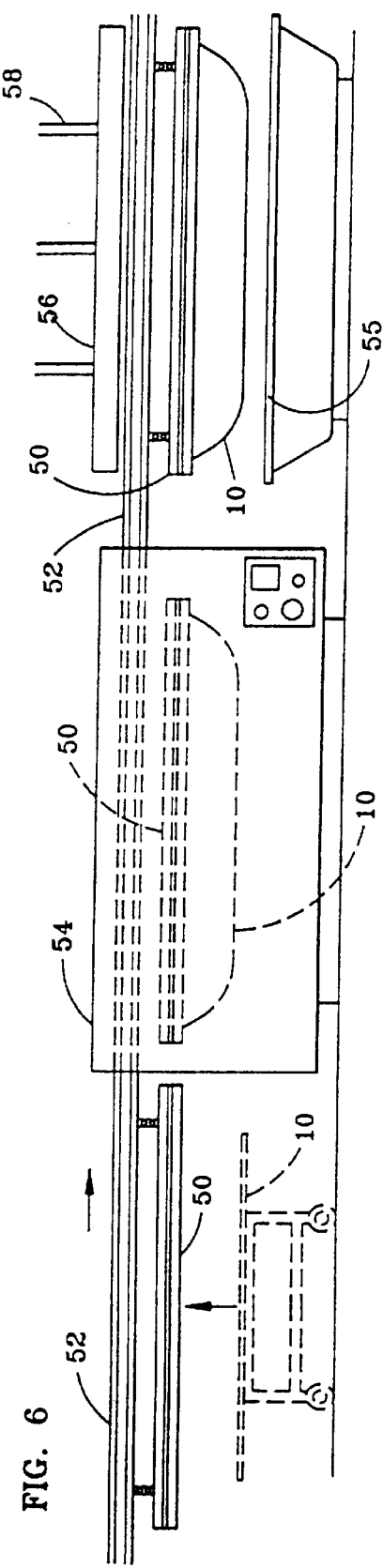
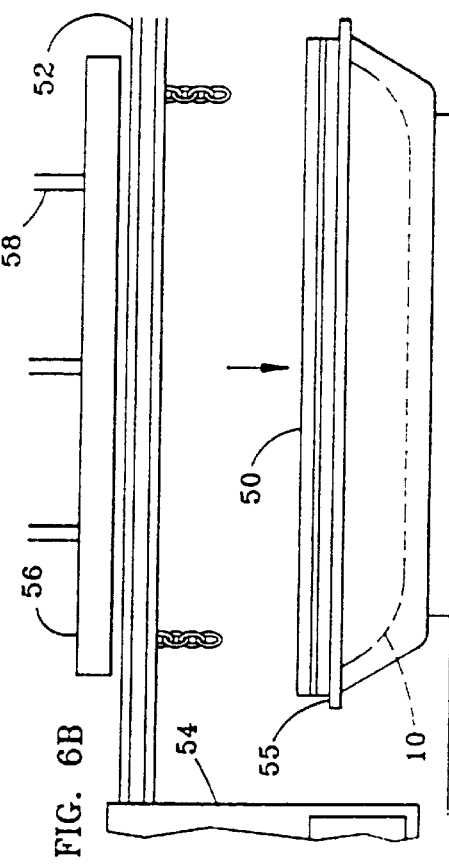
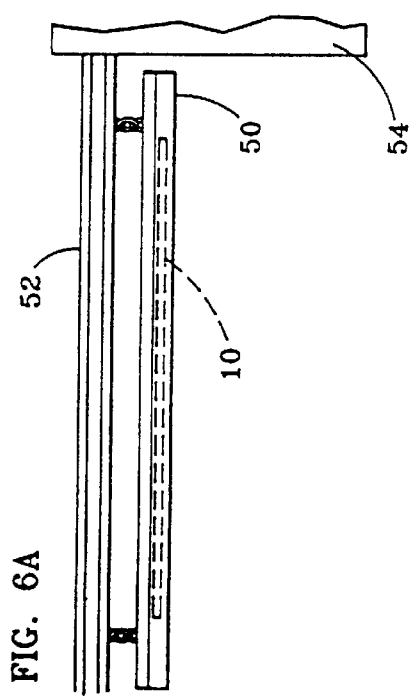
FIG. 6
FIG. 6A
FIG. 6B 0.01"

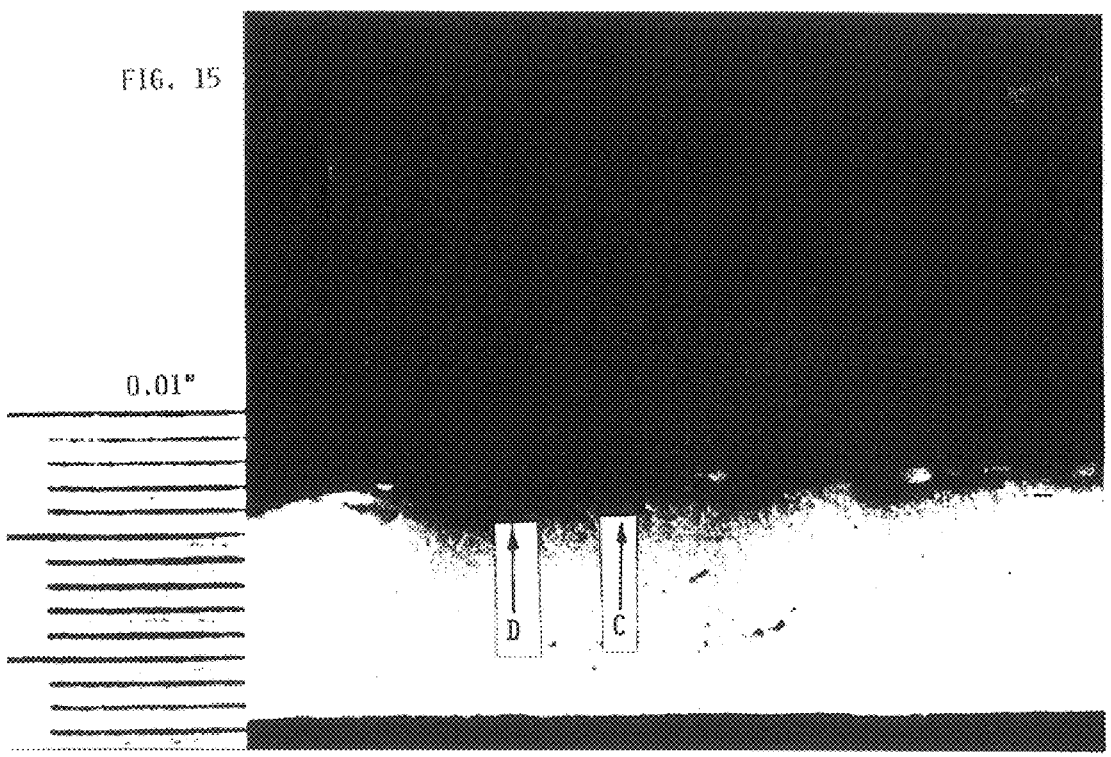

THERMOPLASTIC PRODUCTS HAVING ANTISLIP SURFACES

CROSS-REFERENCE TO RELATED APPLICATIONS

This application is a Continuation of U.S. application Ser No. 08/850,269 filed on Apr. 29, 1997, now abandoned, which was a Continuation-In-Part of U.S. application Ser. No. 08/282,219, filed on Jul. 28, 1994, now U.S. Pat. No. 5,648,031 and of U.S. application Ser. No. 08/776,478, filed on Apr. 21, 1997, now U.S. Pat. No. 5,858,508, which was a 371 of PCT/US95/09193, filed Jul. 19, 1995.

FIELD OF THE INVENTION

The invention relates to thermoplastic products having slip resistant surface properties. The invention particularly applies to thermoformed pickup truck bed liners having an increased coefficient of friction on load bearing and cargo carrying surfaces thereof. The invention further relates to a variety of other practical and industrial applications such as pallets, totes and trays for packaging and shipping, sport and recreational products, and walking surfaces such as marine docks and decks, swimming pool surfaces, showers, bathtubs, walks, stairs, and floor mats.

BACKGROUND INFORMATION

Thermoplastic materials are being used to manufacture a growing variety of products. Thermoplastics can be conveniently and economically formed by various methods including thermoforming, injection molding, blow molding, compression molding, rotational molding, and extruding, for example. Products made of thermoplastics are durable, economical, and adaptable to many different applications. One disadvantage that has plagued many thermoplastic products is a relatively low surface coefficient of friction. In other words, the thermoplastic surfaces are too slippery to be acceptable in some applications. The thermoplastic surfaces become especially slippery when wet, and thus may present dangerous conditions when thermoplastic products are used in an outside environment, e.g. pickup truck bed liners, or used in typically wet conditions, e.g. swimming pool or spa areas and marine docks and the like, and especially when the thermoplastic materials form walking surfaces, e.g. steps, floor mats, runners, and the like.

A particular thermoplastic material that has been proved economical and suitable for making many different products is high density polyethylene (HDPE). However, high density polyethylene exhibits a rather low coefficient of friction, especially when wet, so it particularly suffers the disadvantages of slipperiness mentioned above. This problem is well recognized in the field, and various attempts have been made to correct it. One approach for increasing the surface coefficient of friction involves mechanically forming a rough surface texture on the thermoplastic material, for example by embossing the surface of the product as it is being molded. Disadvantages of this approach are that the embossing increases the cost and complexity of the molding or other forming operation, the embossed surface textures have been found to perform inadequately when wet, and the embossed surface textures can wear down with use, whereby the coefficient of friction is again reduced to that of the smooth ordinary HDPE.

Another approach for trying to improve the surface coefficient of friction is to apply a surface coating onto the polyethylene material. The difficulty with such an approach is that the HDPE is rather inert and molecularly non-active, so that conventional antislip coating materials do not adhere sufficiently to the HDPE surface. Thus, the durability and wearability of the surface is inadequate, because the coating materials peel or flake off of the HDPE. In order to provide sufficient adhesion, prior efforts have involved forming a continuous film of an antislip material onto the HDPE surface, for example by coextruding or coforming the antislip film with the HDPE material. By providing such a continuous film of antislip material, the surface area of contact adhesion is maximized, and the locations at which peeling, separation, or abrasion of the antislip material from the underlying HDPE material are minimized. Unfortunately, the use of a continuous film of an antislip material increases the cost of the product, limits the types of forming or molding processes that can be used to manufacture the product, and also increases the cost and complexity of carrying out the forming method.

An example of the above discussed attempts to use a continuous film of nonslip material on an HDPE base material is represented by conventional bedliners for pickup truck cargo carrying areas. Essentially all truck bed liners are thermoformed from high density polyethylene (HDPE) sheets. Other materials such as ABS, synthetic rubber plastic, and other thermoplastic polymers are sometimes used. The thermoplastic sheets are heated to a thermoforming temperature in a thermoforming oven and are deformed by ambient air pressure after application of vacuum on one side in a thermoforming mold to produce the desired product. Many products other than truck bed liners are also manufactured by this process.

U.S. Pat. No. 4,693,507 (Dresen et al.) describes a truck bed liner with antislip surface properties. The disclosure of U.S. Pat. No. 4,693,507 is incorporated herein by reference. An increased coefficient of friction on the liner surface is achieved by applying a continuous film or layer of elastomeric material over the HDPE sheet. The thickness of the integral elastomeric layer or film is typically in the range of 25 mils–30 mils ($625\mu$–$750\mu$). The elastomeric film is preferably coextruded over the HDPE sheet which is typically 180 mils–250 mils (4.5 mm–6.2 mm) in thickness. The elastomeric film layer can alternatively be applied to the HDPE sheet by lamination, by an adhesive, or by heat application.

According to the Dresen et al. scheme, an increased frictional force is achieved primarily by the "plowing effect" or embedding effect of harder cargo pieces pressing into the softer continuous elastomer film layer. This antislip plowing effect is attributable to the continuous film or layer of the softer elastomer. A disadvantage of the Dresen et al. scheme however, is that the frictional force attributable to the integral elastomeric layer is reduced, and the layer also becomes slippery, when it is wet. Another disadvantage of the Dresen et al. method is the increase in cost of adding and applying the integral and continuous film layer of elastomeric material by coextrusion, lamination, adhesion, or heat application. The elastomer film of Dresen et al. generally extends across the entire substrate plastic sheet. The Dresen et al. film also does not allow different antislip characteristics to be achieved at different locations, namely the film has a uniform antislip characteristic over the entire area to which it is applied.

OBJECTS OF THE INVENTION

In view of the above discussion, it is an object of the present invention to provide thermoplastic products that have more effective antislip surface properties in a manner that is more economical and adaptable to a greater variety of products. More specifically, the invention aims to avoid the disadvantages in the prior art, namely to provide a thermoplastic product having an antislip surface that retains its antislip surface properties even when wet, that avoids the use of a continuous film of antislip material, and that provides good adhesion, durability and wearability of the antislip material on the thermoplastic base material of the product.

It is a further object of the invention to provide methods of imparting antislip properties to thermoplastic surfaces, which increase frictional forces and the coefficient of friction for wet as well as dry surfaces. The different methods are respectively suitable for achieving different characteristics of the antislip surface, and for application to different products formed by different techniques. A first method is especially suited to form an antislip surface be fore and during the thermoforming of the product, and a second method is particularly suited to provide an antislip surface on a product that has been previously molded or otherwise formed.

Another object of the invention is to increase the practical coefficient of friction and frictional force on thermoplastic surfaces by means of increased three dimensional macroscopic surface relief, asperities, and roughness. This is to be accomplished with hard and tough antislip materials preferably having viscoelastic or elastomeric properties and a hardness that is not brittle or sharp. It is thus an object of the invention to specify particular materials and combinations of materials that can be applied as preferably discrete individual asperities onto a thermoplastic base material, and especially HDPE, with sufficient adhesion to avoid abrasive removal thereof.

A further object of the invention is to impart antislip properties and increase the coefficient of friction on thermoplastic surfaces by the composition of the surface with reduced materials and expense and without the cost of handling and applying continuous or integral film layers on a substrate plastic surface. Furthermore, the antislip surface can easily be applied very selectively to only portions of the thermoformed plastic surface in any shape or configuration while leaving other areas untreated. Also, the invention aims to allow the resulting coefficient of friction to be adjusted or tailored to the particular application, even with different coefficients of friction on different surface areas of the product.

SUMMARY OF THE INVENTION

In order to achieve the above objects, the invention provides thermoplastic products having antislip surfaces formed by a plurality of asperities comprising an antislip polymer applied and durably bonded onto a selected surface area of a thermoplastic base member. The asperities are primarily separate from one another so as to leave the thermoplastic base member exposed between the asperities and so as not to form a continuous film of the antislip polymer. The asperities provide a relatively increased coefficient of friction of the selected surface area in comparison to a base coefficient of friction of the thermoplastic base member without the asperities thereon. The invention especially provides a liner for lining a cargo area of a vehicle. The liner includes a liner floor comprising a thermoplastic polymer, and the antislip asperities applied and durably bonded onto an upper surface thereof. Additional asperities may be provided on the bottom surface of the liner, to enhance the frictional gripping of the liner on the vehicle cargo area floor, especially for a mat-type liner. The invention also applies to a floor mat having asperities on a top surface and on a bottom surface thereof. The asperities provide a coefficient of friction that is preferably at least 1.5, or especially at least 2 times the base coefficient of friction.

The present thermoplastic products may especially be made of a base material of high density polyethylene, such as a sheet of HDPE that may be formed or molded by any known process. Other plastics for the base material include polypropylene, polystyrene, ABS plastic, polyvinyl chloride, TPO/TPR, acrylic, PET, polycarbonate, and nylon, for example. The base material may also be a multi-layer material, for example including a layer of another polymer coextruded or laminated over a polyethylene base layer, with the antislip asperities applied onto the coextruded or laminated layer. The antislip material may particularly be a thermosetting polymer, and preferably a polyurea based polymer, and most preferably a hybrid polyurea-polyurethane polymer formed from a polyurea prepolymer and an isocyanate.

The antislip surface treatment may be applied to the present products by at least two different types of methods. U.S. Pat. No. 5,648,031 (Sturtevant et al.), which issued from the parent of the present application, describes a first method for applying the antislip surface treatment, which generally involves applying droplets of the antislip polymer onto the thermoplastic base material, for example by spraying, and then heating and thermoforming the base sheet with the antislip material droplets thereon. The thermoforming process preferably hardens the droplets of antislip material into tough macroscopic asperities that cause a relatively higher coefficient of friction on the treated surface area, and durably bonds the antislip material onto the thermoplastic base material. Furthermore, the application of the antislip droplets is limited, so that the resulting bumps preferably cover less than 50% of the treated surface area, i.e. leave more than 50% of the thermoplastic base material exposed. Also, according to the first method, the antislip polymer is preferably selected so that the resulting antislip bumps or asperities have a hardness that is greater than the hardness of the thermoplastic base material.

The above discussed first method of manufacturing the present thermoplastic products having antislip surfaces was the original method determined to achieve good product results, e.g. frictional characteristics and bonding of the asperities onto the base sheet. Through further study, the inventors have determined that a second method may also be effectively used to achieve good product results, with a different or broader range of applicability. The second or alternative method does not require the thermoplastic product to be thermoformed after the antislip material is applied onto a surface thereof. Instead, the thermoplastic product can be formed by any conventional forming or molding process as a prior or initial step, and subsequently the antislip surface treatment is applied onto the previously formed product and then heat treated, as will be discussed below.

As such, the second method can be used for making a broader range of products, i.e. products that are not thermoformed, but instead are formed by injection molding, blow molding, compression molding, rotational molding, etc. The second method can also be applied to products that are thermoformed. The second method is particularly useful in applications in which it is desired to apply an antislip surface treatment on a surface that necessarily faces or contacts the mold during the forming operation. Generally, either or both of the methods are useful for applying an antislip surface onto vehicle cargo bedliners, such as cargo area liners for pickup trucks, sport utility vehicles, passenger cars, agricultural vehicles and the like, vehicle floor mats, flooring steps and deck surfaces of swimming pools and spas, bathtubs, shower floors and the like, walking surfaces that are subject to wet conditions, such as mezzanines, marine decks and docks, step plates, ramp and conveyor surfaces, plastic lumber fabricated structures, and the like. Another important area of application is for returnable packaging, shipping, and goods handling products, for example to apply an antislip surface onto the decks, fork surfaces, and footprint surfaces of pallets, and trays, spacers, totes, bins, and slip sheets used for shipping and handling various goods. This provides a significant advantage over the prior art use of rubber rims, lips or feet which are independent separable components. The second method may further particularly be used for applying antislip surfaces to recreational and sporting equipment surfaces, such as watercraft deck surfaces, playground equipment, exercise equipment, sleds, shed floors, and the like, landscaping and geomembrane sheets and liners, including landfill friction sheet and landscape reshaping restraints, and floor coverings such as mats and runners.

Furthermore, the inventors have found that other limitations originally discussed in U.S. Pat. No. 5,648,031 are not strictly necessary. For example, the surface area coverage ratio of the bumps or asperities of antislip material does not need to be limited to a range less than 50%. Instead, the antislip material may be applied to cover a surface area percentage of 60 or 70%, for example, limited only so as to avoid forming a continuous film or layer of the antislip material. This greater range of coverage ratios of the antislip material pertains to both the first and the second methods. Also, the size of the bumps or asperities produced according to the second method is generally preferred to be slightly larger, on average, than the size of the bumps or asperities produced according to the first method.

It has also been discovered that the antislip bump material does not have to be harder than the base material, but instead can be designed and processed to be softer or to have about the same hardness as the base material, depending on the particular product application. For example, harder bumps are preferably used if the intended application involves softer goods, such as cardboard cartons, being placed onto the antislip surface, and softer bumps are preferably used if the intended application involves harder goods, such as steel parts, being placed onto the antislip surface. Moreover, the relative hardness of the asperities depends on the hardness of the base material, whereby for example, HDPE may even have a hardness up to 90 Shore D. This feature applies to both the original or first method and the alternative or second method, but the bump hardness is particularly adjustable by controlling the processing conditions in the second method. In other words, the thermoforming process applied during the course of the first or original method generally results in antislip asperities that are harder than the base material, while the hardness of the asperities is especially adjustable or variable by the second method.

Further studies carried out after the time of filing the parent application resulting in U.S. Pat. No. 5,648,031 have shown that there are two important common or unifying features between the first method and the second method, for achieving good frictional characteristics and good adhesion of the asperities onto the thermoplastic base material. The first important common feature is the particular polymer materials that can be used for providing a durable antislip surface on thermoplastic products, and especially high density polyethylene products. The second common feature is the need of a heat treatment of some kind to enhance the bonding of the asperities onto the thermoplastic base material.

Particular preferred aspects of the original or first process according to the invention will now be discussed. As will be apparent, many of these aspects also pertain to the second or alternative method. The original process is for selectively forming an antislip surface on a product to be thermoformed from a plastic sheet. The plastic sheet may be formed of any suitable thermoplastic polymer material such as polyethylene, ABS, synthetic rubber, thermoplastic polymers such as polypropylene, and e.g. other polyolefin thermoplastic polymers. Typically the original method proceeds by cleaning the surface of the plastic sheet for removing oils and other contaminants and preparing a good bonding surface. The method further proceeds by masking the plastic sheet for exposing selected surface areas to be treated with the antislip surface and covering other areas not to be treated. In some applications the cleaning and masking steps are not required.

An embodiment of the original method includes atomizing into droplets a sprayable polymer, preferably a thermosetting elastomeric polymer or other polymer having a viscoelastic or elastomeric component and a relatively rapid reaction time. Other polymers which harden to a hard tough plastic material without brittleness or sharpness can also be used as hereafter described. The original method proceeds by flash spraying a mist of the atomized droplets onto the masked plastic sheet, or otherwise forming and applying the droplets to the selected exposed area of the plastic sheet. The droplets are deposited so that they form a stippled pattern of primarily separate bumps or pimples across the treated surface area. The original method also preferably includes controlling the time duration of the flash spraying or otherwise controlling the application of droplets so that the bumps or pimples cover or occupy substantially less than 50% of the treated surface area leaving the underlying plastic sheet substantially exposed between the droplets.

By reason of the masking step, the stippled pattern of primarily separate droplets or pimples can be selectively applied over only a portion of the HDPE sheet in any desired shape or area configuration. The treated surface area can thereby be limited for example to a cargo carrying surface or only a portion of the cargo carrying surface. By way of example, only a fraction of the cargo carrying surface, such as one half of the surface, can be treated for a higher coefficient of friction while the other half remains as an HDPE surface with lower coefficient of friction. Thus the right half of the truck bed liner surface may be treated to provide an antislip surface for cargo containers while the left half permits sliding of the objects for loading and unloading. As a further alternative, the stippled pattern of primarily separate droplets need not be selectively applied and the masking step can be eliminated. For example, the entire HDPE sheet can be treated with the stippled pattern of separate droplets to impart antislip properties over all the surfaces of the truck bed liner or other thermoformed product.

As a next step of the original method, the droplets forming the stippled pattern are at least partially hardened, dried and solidified in an initial drying step. The plastic sheet is then thermoformed according to standard thermoforming procedures at thermoforming temperatures to produce the product. The thermo forming process causes intimate bonding of the droplets to the plastic sheet and relative hardening of the droplets to form three dimensional macroscopic asperities having an enhanced relief and surface roughness, causing a relatively higher coefficient of friction over the treated surface area.

Thus, a feature of the method is that the process steps produce an antislip surface across the treated surface area with enhanced relief in the form of three dimensional macroscopic asperities and surface roughness. These macroscopic asperities of the antislip surface engage the peaks, valleys and surface relief of objects placed on the antislip surface by interlocking of asperities and macroscopic roughness on the two surfaces. As a result, the coefficient of friction and frictional force is substantially increased relative to an untreated surface, and is not substantially reduced when the surface is subsequently made wet. The enhanced surface roughness and macroscopic asperities are achieved by several coacting effects of the interacting process steps.

First it has been found that the thermoforming temperatures and process cause an intimate physical or chemical bond between the thermosetting elastomeric polymer droplets and the plastic sheet typically composed of high density polyethylene. The bonding between the droplets and the HDPE sheet is apparently as strong as the bonding of polyethylene to polyethylene, and the droplets cannot be scraped off without cutting through the bonded materials. This bonding between the droplets and the HDPE sheet is enhanced by mixing with the thermosetting elastomer a small amount of an adhesion promoter which bonds or cross links both to the thermosetting elastomer and to the HDPE sheet.

Second it appears that the thermo forming temperatures cause a relative hardening and post-cure thermosetting of the thermoset elastomeric polymer that was sprayed in droplet form and initially hardened, dried and cured on the exposed surf ace areas of the plastic sheet. While the thermosetting elastomer retains some elastomeric properties, it is further hardened as compared to its condition prior to heat curing. The increased coefficient of friction and frictional force effect is therefore achieved primarily not by elastomeric properties but by the relative hardness and the surface texture of the droplets forming macroscopic asperities across the treated surface area. Other sprayable or liquid polymers that are formable into droplets and hardened by the thermoforming process can also be used as hereafter described.

Third, the projecting asperities, pimples, or projections formed by the droplets bonded and hardened across the treated surface area are enhanced in relief by an effect referred to by the inventors as the "moth effect". Thermoforming heat is generally applied to both sides of the plastic sheet by a variety of heater arrangements such as infra-red radiant heaters and catalytic gas burners for example. Electrical heating elements with blowers are also typically used. The inventors have noted that if a moth falls on the plastic sheet before or during heating of the sheet, then a corresponding moth-shaped outline or plateau rising slightly above the surrounding area of the sheet will be formed during the thermoforming process. It is believed this effect is due to "shading" or "screening" provided by the moth, which produces a temperature differential. Thereby, the higher temperature areas surrounding the shaded outline of the moth are subject to differential thermoforming and thinning, so that these surrounding areas are more greatly thinned and pulled away from the moth shaded area. This causes a slightly differential thickness or enhanced surface relief according to the pattern of differential temperatures.

Similarly it has been observed that the droplets forming a stippled pattern across the treated surface area shade or screen the spots under the droplets from the heat sources used to bring the plastic sheet to thermoforming temperatures. The stippled pattern of droplets thus produces a corresponding stippled pattern of shading and differential temperatures across the surface area to be treated. Furthermore, the droplet material mechanically reinforces the plastic sheet to resist vacuum forming at the locations under the droplets. During thermoforming, the areas of the plastic sheet surrounding the droplets are vacuum formed, stretched and pulled to a lesser thickness than the shaded areas under the droplets. In other words, the covered or shaded areas directly beneath the droplets are not heated and softened as much as the exposed or non-shaded areas, so that the softer exposed areas of the base sheet are more greatly stretched and thinned than the shaded or covered areas during the thermoforming process. This effect enhances the relief, projection and elevation of the macroscopic asperities, and the roughness across the treated surface area. For example, it has been observed that the height of the asperities on a finished thermoformed product is in a range from more than one up to two times the height of the droplet projections on a sheet before or without thermoforming.

Finally, some of the droplets atomized from the viscous thermosetting elastomeric polymer entrap air or other gases. The entrapped air or gases may burst or explode through the top of the droplet during thermoforming thereby causing a so-called "volcano effect" that forms rough edges around resulting craters or blow-holes in the droplets to increase the coefficient of friction. The increased roughness is achieved on the hard, tough pimples without brittleness or sharpness. Moreover, it has been reported that the inventive asperities in general, and particularly the rough crater edges formed by the volcano effect cause a hook-and-loop fastening effect when placed in contact with carpet. This is very advantageous for providing an antislip surface on the underside of floor mats and the like.

In the preferred example embodiment the original process includes cleaning the surface of the plastic sheet by flame treatment for burning off contaminants and preparing a good bonding surface, applying the droplets, at least partially hardening and solidifying the droplets forming the stippled pattern over the treated surface area, and thermoforming the HDPE sheet to form the final product in the thermoforming temperature range of 250° F.–550° F. and preferably in the range of 370° F.–400° F. The step of initially drying or hardening and solidifying the droplets before thermoforming can be accelerated by heating. The time duration of the flash spraying may be controlled to an interval for example down to a fraction of a second through a spray head at a relatively high pressure, for example in the range of 1,000–2,000 psi. Typically the flash spraying is from a spray head at a distance from the HDPE sheet in the range of 2.5'–4.5' (0.75 m–1.35 m).

According to the preferred examples, the atomizable or sprayable polymer is selected to form hard and tough pimples durably bonded over the selected antislip surface after thermoforming. The durably bonded hard and tough droplets are not brittle or sharp. A variety of starting polymers can be used for the atomizable, sprayable polymer designed to achieve the desired characteristics of hardness, toughness, and strong bonding and without impact brittleness or sharpness. The atomizable, sprayable polymer is preferably a thermosetting elastomeric polymer such as, for example, polyurea prepolymers and polymers, hybrid prepolymers and polymers such as hybrid polyurea polyurethane polymers in which the polyurea bonds predominate, and other polyether resins generally including epoxy resins, for example. High temperature tolerant thermoplastics such as polyester resins, as well as HDPE and PVC are also suitable.

It is noted that both thermosetting polymers and thermoplastic polymers as well as combinations of thermoset and thermoplastic can be used for the sprayable polymer. The sprayable polymer is selected to provide the hard, tough pimples on the stippled surface. The polymer or polymer mixture is selected to provide toughness and a hardness of the asperities that is preferably greater than the hardness of the underlying thermoplastic sheet but below brittleness and sharpness. Alternatively, and especially according to the second method, the asperities may have the same or a lower hardness than the base material.

If thermoplastic polymers, such as styrene, are to be used for the droplets, then they are first made sprayable by mixing with a suitable solvent. After being sprayed on, the droplets are initially dried and hardened by evaporating the solvent. Alternatively, lower viscosity thermoplastics can be made sprayable by heating the bulk thermoplastic polymer material to a suitable temperature at which droplets can be formed for misting or spraying. Initial drying and hardening is achieved by lowering the temperature to a suitable hardening temperature. For the thermosetting resins, sprayability is achieved as described above by mixing and spraying the reacting components. Initial drying and hardening is achieved by the reaction of the components. It is also noted that the selection of the sprayable polymer or polymer mixture increases the friction on the stippled surface not only by the surface profile of hard macroscopic asperities but also by the composition of the surface material. For example the polyurea polymer asperities as well as asperities of other thermoset and thermoplastic polymers provide greater interaction with any object passing over the surfaces than does the HDPE surface of the underlying sheet.

The polymer droplets can be formed and applied on the selected surface area by methods other than misting and spraying. For example, the droplets can be formed and applied by a roller containing the polymer in sprayable or liquid form. The roller has pin holes or ejector holes through which droplets are dispensed as the roller passes or turns over the selected surface area. The pin holes or ejector holes are arranged with the appropriate density for dispensing droplets on preferably less than 50% of the surface area. Alternatively the substrate sheet can pass under a droplet dispenser having a reservoir of the polymer in sprayable or liquid form. The reservoir is formed e.g. with one or more rows of pinholes for forming and dispensing droplets on the selected surface area in the desired density covering less than 50% of the surface area according to preferred examples. As a further alternative, a plurality of nozzles may extrude plural continuous or intermittent strings, stripes or ribbons of the polymer onto the base sheet.

As used in the specification and claims, the adjective "sprayable" does not necessarily imply that the polymer is sprayed but rather that the polymer is prepared in a sprayable condition, such as liquid form, capable of formation into droplets. The sprayable polymer may then be formed into droplets and dispensed by misting and spraying or by "dripping" into droplets falling on the selected surface area or applied onto the selected surface area by a roller or reservoir dispenser or other droplet applying means, such as extruder nozzles extruding strips or stripes of the antislip material.

Appropriate additives and agents may be required to achieve the desired characteristics. An adhesion promoter can be added to the thermosetting elastomeric polymer, thermoplastic polymer, or polymer mixture, in the range of for example 1%–7% by weight and preferably about 5% by weight of the mixture. A suitable adhesion promoter is for example a cross linking Melamine resin.

The preferred size range of the droplets of the viscous thermosetting elastomeric polymer, thermoplastic polymer, or polymer mixture for the original method is 2 mils-30 mils ($50\mu$–$750\mu$) in diameter. Larger size droplets can also be used. After thermoforming, the bumps or asperities forming the stippled pattern of pimples across the treated surface area portion are also substantially in the size range of 2 mils-30 mils ($50\mu$–$750\mu$) although larger size bumps are also suitable.

Particular preferred aspects of the second or alternative process according to the invention will now be discussed. Most of the features and aspects relating to the original process also pertain to the second or alternative process. For example, the possible base materials and the antislip materials applied thereon relating to the first process can also be applied according to the second process. The process steps relating to cleaning the base material, masking the base material, and applying the antislip material, preferably by spraying droplets of the antislip material onto the base material, also pertain to the alternative method. However, as discussed above, the starting base material for the second alternative method is a product that has already been formed or molded essentially into its finished form, before the antislip treatment is carried out.

The second alternative process generally includes a preliminary or prior step of molding or forming and then trimming, in the usual or conventional manner, the article that is to be treated with the nonslip surface. The thermoplastic article is then cleaned to remove any mold release compound, or other surface contaminants such as dirt, oils, fingerprints, or the like. Next, the surface of the article to be treated is oxidized or polarized by a flame treatment, electrical corona discharge, chemical treatment, for example with chromic acid, the so-called USM process, or a suppressed spark method. Thereafter, the antislip polymer material, preferably a two-component thermosetting polymer, is applied onto the oxidized surface, preferably by spraying. Finally, the treated surface with the antislip material droplets or bumps thereon is subjected to a heat treatment preferably in the range of 100 to 200° F., and especially above 120° F., for a time in the range of 30 to 60 seconds, in order to harden the antislip polymer material and durably bond it onto the base material.

Due to the lack of a thermoforming step after the antislip material droplets are applied, the second or alternative method does not provide the above described "moth effect" and generally does not provide the above described "volcano effect". Thus, the resulting bumps or asperities generally do not have the enhanced roughness provided by the cratering caused by the volcano effect, and do not have the slight enhanced relief caused by the moth effect.

The invention is particularly applicable to truck bed liners manufactured from an HDPE plastic sheet or other thermoplastic sheet. The plastic sheet is masked to expose a portion of the cargo carrying surface of the truck bed liner for treatment with an antislip surface. Other applications for the invention include slip sheets, pallets, and other industrial applications as well as games and recreational products such as "slide bars" and ski devices. Other applications include industrial, commercial, domestic, and recreational products. In the case of slip sheets and other substantially flat surface products, thermoforming can take place in a mold with a shallow basin well according to the first method, or the second method can be used without thermoforming. An undersize sheet can be used so that the flat surface product portion is pulled into the shallow basin to achieve the differential thinning effect with enhanced asperities in the first method. Such thermoforming achieves the enhanced and increased three dimensional relief provided by the macroscopic droplet asperities rising above the surrounding surface of the vacuum thinned plastic sheet in the first method. The thermoforming of the first method, or the heat treatment of the second method, also completes a secure bonding between the droplets and the HDPE substrate and causes a relative hardening of the thermoset polymer droplets.

Other objects, features and advantages of the invention are apparent in the following detailed description and accompanying drawings.

BRIEF DESCRIPTION OF THE DRAWINGS

FIG. 6 is a diagrammatic side view of a process for heating the specially prepared HDPE sheet in a heat treatment according to the second method of the invention, or in preparation for vacuum forming in a vacuum mold according to the first method of the invention;

FIG. 6A is a detailed diagrammatic side view of the HDPE sheet mounted in a frame for sliding into the thermoforming oven, while FIG. 6B is a diagrammatic side view of the heated and sagging or depending HDPE sheet sitting in the vacuum forming mold;

FIG. 15 is a macrophotograph taken at an elevated perspective angle of about 30°, showing a section through a polyethylene base sheet treated with antislip surface asperities according to second method of the invention.

DETAILED DESCRIPTION OF PREFERRED EXAMPLE EMBODIMENTS AND BEST MODE OF THE INVENTION

Figure 7:
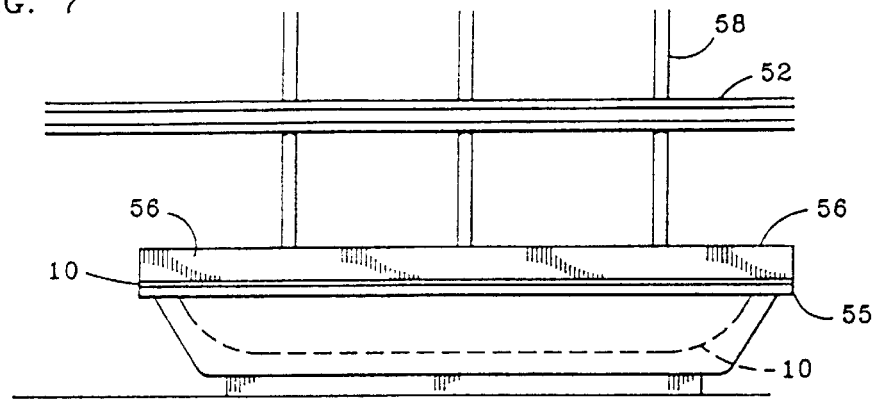
FIG. 7 is a detailed side view of the retention framework holding the HDPE sheet in position during the vacuum forming process in the vacuum mold.

Both the first or original method and the second or alternative method for forming antislip surfaces on thermoformed products according to the invention are illustrated in the example of FIGS. 1 to 6A. FIGS. 6B and 7 particularly relate to the thermoforming step of the original method of the invention. In this example, using either process, an HDPE sheet 10 is to be thermoformed into a pickup truck bed liner 60, of which the cargo carrying surface 12, 62 is to be prepared according to the invention with an antislip surface. Other thermoplastic polymer plastic sheets can alternatively be used. The HDPE sheet is typically in the size range of approximately 5×10' (1.5 m×3.0 m) with a thickness typically in the range of 180 mils-250 mils (4.5 mm–6.2 mm) for forming the bed liner. Other form-stable finished products may be made from thermoplastic sheets or layers having a thickness in a range from 150 mils-400 mils. In a prior operation, the sheet 10 was formed by sheet extrusion or calendering. Alternatively, for the second method of the invention, the sheet 10 may represent the surface of a thermoplastic article, such as a shipping pallet or a children's toy or playground equipment, which has previously been formed by any conventional molding or forming operation and is now to be provided with an antislip surface according to the invention.

The surface portion 12 of the HDPE sheet 10 which will become the top surface of the floor or cargo carrying base of the bed liner, and specifically the portion between the wheel wells, is delineated by tape 14 such as duct tape or masking tape. Any other suitable procedure for marking and indicating the area that will become the cargo carrying portion 12 of HDPE sheet 10 can also be used. In the example of FIGS. 1–7, this cargo carrying portion 12 between the wheel wells is to be prepared with an antislip surface.

Figure 1:
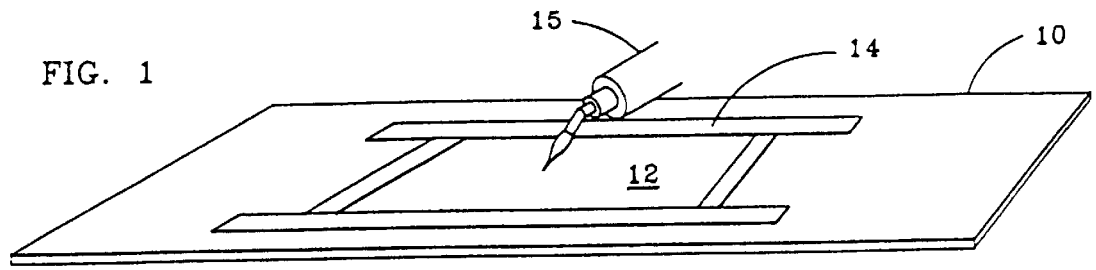
FIG. 1 is a diagrammatic perspective view of a flame cleaning step for cleaning the area of an HDPE sheet to be treated with an antislip surface according to an example embodiment of the invention.

As shown in FIG. 1, the portion 12 of HDPE sheet 10 to be treated is first cleaned to remove grease, oil, and other surface contaminants, and to oxidize or polarize the surface. This is accomplished by briefly applying a torch flame 15 over the surface portion 12 for burning off surface contaminants without disfiguring the surface. This is accomplished in several minutes or less. Electrical corona discharge treatment, chemical cleaning, e.g. with chromic acid, the USM process or the suppressed spark method can alternatively be used. Flame treatment is preferred because it prepares a good bonding surface on the polyethylene plastic material. It has been found that the flame treatment oxidizes the surface and exposes active molecular bonding sites for durable, secure bonding between the applied droplets and the thermoplastic sheet. Flame treatment and oxidation apparently leave polar ends on the plastic material surface for enhanced bonding of the sprayable polymer droplets. The oxidation is preferably carried out to a level of 40 to 80 dines, and more preferably 45 to 60 dines. As a practical test, the surface has been sufficiently oxidized if it can be surfacially wetted by water applied thereto. Since slip agents in the thermoplastic material impede the oxidation process, it is preferable to expressly exclude slip agents from the formulation of the thermoplastic.

It is not known whether the bonding is predominantly mechanical, physical, chemical, or all three, but intimate physical molecular bonding likely is an important factor. Mechanical bonding may also be an important factor to the extent that the droplets in a liquid or plastic state seep into pores and irregularities of the HDPE sheet surface. In that case, mechanical interlocking also contributes to the bonding between the separate pimples and the thermoplastic sheet.

A flame treatment apparatus has been devised with a line of flame long enough to extend across the surface area to be flame treated. The line flame is mounted in fixed position over a table that is mounted on rollers or tracks. The sheet of thermoplastic material is placed on the table and the table is translated by rolling under the line flame for flame treatment of the selected surface area of the plastic sheet. It has been found that flame treatment for a longer period of time produces a better bonding surface. For example, the cargo carrying surface portion passes under the line flame in a time range of 7–21 seconds and preferably a longer time, e.g. about 21 seconds, for preparing a good bonding surface. The duration of the flame treatment is limited to a time which avoids any significant temporary warpage due to the heating of one side of the thermoplastic sheet.

Figure 2:
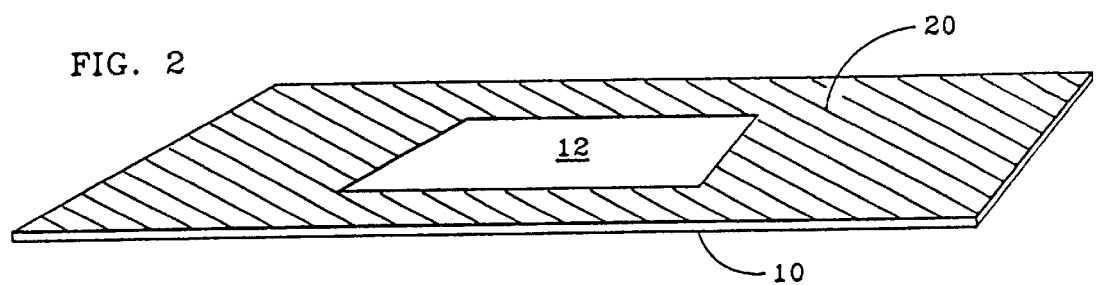
FIG. 2 is a diagrammatic perspective view of the masking step for selectively masking the HDPE sheet and exposing the surface area to be treated.

After cleaning the selected surface area portion 12, the HDPE sheet 10 is masked with a suitable masking material such as kraft paper. The mask 20 exposes the selected surface area 12 on which an antislip surface is to be formed, and covers the other surface areas of HDPE sheet 10 which are not to be treated, as shown in FIG. 2.

Figure 3:
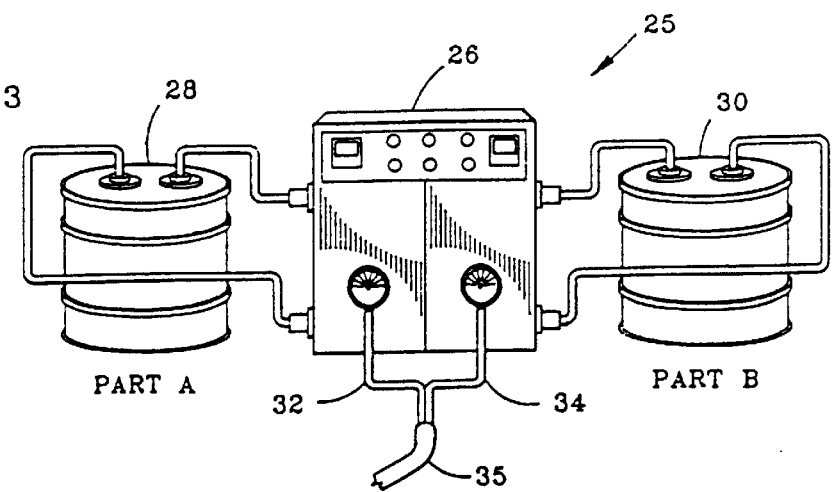
FIG. 3 is a diagrammatic side elevation view of the proportioning unit for mixing, atomizing into droplets, and spraying the thermosetting elastomeric polymer.
Figure 4:
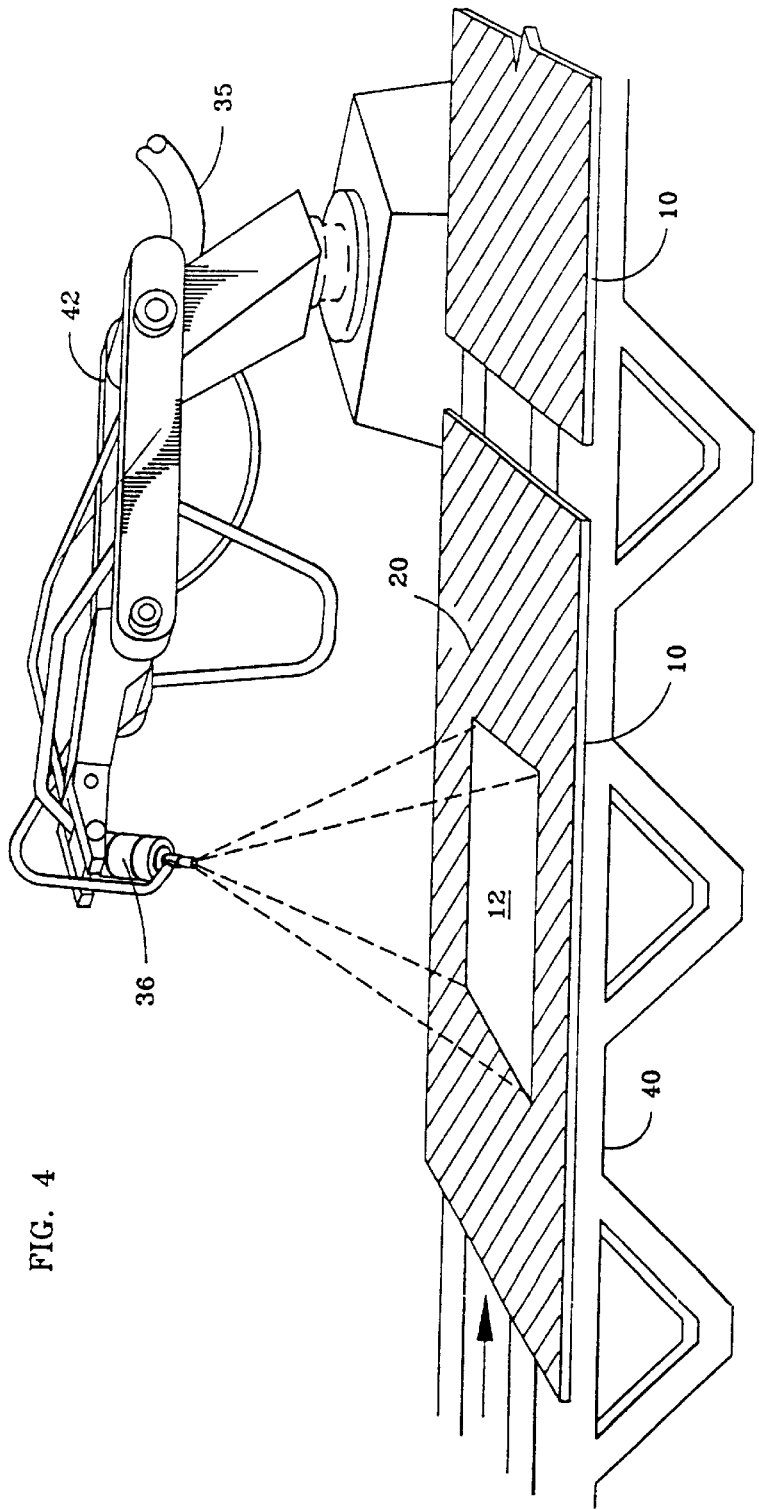
FIG. 4 is a side perspective view of the step of spraying the atomized droplets of thermosetting elastomeric polymer onto the exposed surface area to be treated.

A suitable thermoset elastomer polymer is prepared for spray application on the selected surface 12 to be treated as shown in FIGS. 3 and 4. The mixing, atomization, and spraying of the polymer is accomplished using a standard polyurethane spray system 25, preferably such as a Gusmer spray system available from the Gusmer Corporation of Lakewood, N.J., as a "Proportioning Unit" sold under Gusmer Model No. VH-3000. An adjustable automated pump and proportioning unit 26 mixes Part A and Part B chemical reactants stored in barrels 28, 30 in the desired proportions or ratio. The reactant chemicals are delivered separately through lines 32, 34 joined in a single sheath 35 to the spray head 36 shown in FIG. 4. The sheath or hose jacket 35 is preferably heated to keep the Part A and Part B components at a temperature in a preferred range from 150° F. to 180° F. The spray head mixes, atomizes and sprays droplets of the resultant thermosetting elastomeric polymer as hereafter described.

A suitable thermoset elastomer for use in the process is a polyurea polymer derived from the reaction of a Part B polyurea prepolymer and a Part A isocyanate such as a diisocyanate. The polyurea prepolymer differs from the more conventional polyurethane prepolymer. It is an amine terminated polyether rather than a hydroxyl terminated polyether or polyol. The NCO groups of the isocyanate react preferentially and more quickly with amine terminated polyethers. The amine terminated polyethers will also displace the hydroxyl terminated polyethers. The resulting polyurea bond is tougher than the polyurethane bond and withstands higher temperatures without breakdown or degradation.

A suitable polyurea prepolymer for use as Part B is sold under the trademark Jeffamine (™) by Huntsman Corporation of Austin, Texas. The Jeffamine (™) polyurea prepolymer is an amine terminated aliphatic polyether with both diamine and triamine terminations. The diamine terminations retain flexibility in the reacted polymer while the triamine terminations promote cross linking for increased stiffness. The proportions of diamine and triamine can be adjusted according to the particular application, for example to achieve a desired level of hardness in the finished antislip asperities. A general (non-tradename) example of a suitable Part B component is a di-(metho)toluenediamine.

An adhesion promoter of Melamine monomer resin is mixed with the Jeffamine (™) polyurea prepolymer in an amount preferably equal to approximately 5% by weight of the mixture. The Melamine monomer is advantageous because it bonds to both the polyurea prepolymer and the HDPE substrate. The cross linking Melamine resin therefore promotes bonding between the reacted polyurea polymer and the HDPE sheet substrate. Other adhesion promoters can also be used and the concentration of adhesion promoter can be varied over a range e.g. from 1%–7% by weight. A premixed Jeffamine (™) type polyurea prepolymer and cross linking Melamine resin adhesion promoter can be obtained in proper premixed proportions from Enichem America, Inc., 1448 VFW Drive, Conyers, Ga. 30207, under the Enichem product code EC856M.

Part A in the present example embodiment is an isocyanate with NCO groups for reacting with the amine terminations of the polyurea. A particular isocyanate suitable for reaction with the modified polyurea prepolymer is diphenylmethane-4 4' diisocyanate, for example sold under the Enichem product code EC856MFLX21. Other isocyanates and diisocyanates can alternatively be used for Part A. Two suitable mixed proportions of Part A relative to Part B are 0.47 and 1.0. For convenience, the blending ratios are usually referred to as B:A ratios, whereby the preferred B:A ratios are in the range from 1:1 to 2:1. However, the ratio may be selected to achieve different final product characteristics of asperity hardness, bonding and coefficient of friction, over a typical ratio range of Parts B to A of e.g. 0.4–4.0. Within this range, the resulting polyurea isocyanate polymer after thermoforming may have a flex modulus or stiffness in the range of 10,000–80,000 psi and durometer or hardness in the range from 40 A to 70 D Shore hardness, as desired for different applications.

A feature of the modified polyurea prepolymer is that it also incorporates a small percentage, for example in the range of 5%–7% by weight, of polyurethane type hydroxyl terminations or bonds in the isocyanate. This small percentage of polyurethane terminations assists with initiation of the reaction between the polyurea and isocyanate. Once the reaction is initiated, the polyurea bonds between the amine terminations and NCO groups react with greater speed and the NCO groups of the isocyanate preferentially react with the amine terminations. The polyurea/ isocyanate reaction can take place for example in the range of several seconds to 30 seconds for a fast reaction time.

For controlling the speed of the reaction, blockers can be added to the reacting mixture to slow the reaction time and allow the mist of droplets to settle on the exposed selected surface area for good bonding to the plastic sheet. By way of example, a blocking agent or slowing agent can be substituted on some terminations to control the rate of the reaction and slow the reaction time to the range of e.g. 20 seconds to a minute or more.

In the preferred example, however, the process time and droplet size are controlled by the temperature of the reaction rather than by blocking agents. The proportioning unit 26 incorporates heaters for heating the reactants. Lines 32, 34 in sheath 35 may also incorporate a line heater. The reactants are typically heated in the range of 150° F.–185° F. and more preferably 168° F.–180° F. for atomization and spray or mist application. It has been found preferable to regulate the temperature of reactants to the lower end of this range, e.g. down to 168° F. or even down to 150° F. At this lower temperature the reactants are more viscous and form larger droplets of more consistent size at the larger end of the size range of 2 mils-30 mils ($50\mu$–$750\mu$). The larger droplets have been found preferable in providing better bonding of the separate droplets to the surface of the polyethylene or other thermoplastic sheet, especially according to the second method of the invention. At the lower temperature range the consistently larger droplets also settle on the plastic sheet before the polyurea/isocyanate reaction is complete, further enhancing bonding with the plastic sheet.

Other atomizable and sprayable polymers may be used for preparing an antislip surface, including selected polymers and polymer mixtures and combinations capable of spray-on or mist application. The plastic polymer may be either thermosetting or thermoplastic or both, but should be selected to achieve the following characteristics. The sprayable polymer or polymer mixture should be relatively fast reacting and provide durable bonding to the thermoplastic sheet substrate. It should form separate droplets or pimples which, in the finished product, are hard and tough, but not brittle and sharp, in the finished product, after thermoforming or heat treating. A variety of sprayable resins, polymers or mixtures, thermosetting resins, thermosetting elastomeric resins, and thermoplastic polymers can achieve these characteristics. Polymer chemists skilled in this field will be able to select or design particular polymer combinations and formulas within the scope of the present invention to achieve the desired characteristics.

As further described herein, polyurea polymers are preferably used because the polyurea bonds respond favorably to the heat treating or thermoforming process thereby enhancing the desirable characteristics of the polyurea polymer. While a preferred thermosetting elastomer polymer according to the present invention is the polyurea polymer, hybrid polyurea polyurethane polymers can also be used as long as the polyurea bonds and the polyurea polymer predominate because the polyurethane bonds may be adversely affected by the thermoforming or heat-treating process heat, causing breakdown of the bonds. The polyurea bonds should therefore predominate over the polyurethane bonds. Other polyether resins, such as epoxy resins amenable to spray on application, can be used. Certain thermoplastic polymers such as polyester polymers and mixtures and other coacting polymer combinations capable of withstanding the high thermoforming temperatures or heat treating temperatures may also be selected or designed for the process.

Furthermore, particulate matter to act as friction enhancers, such as sand, sandblasting grit, other mineral grits, polymer granules or particles, or polymer powder can be added to the antislip polymer during spray application, for example using a piggy-back nozzle on the spray gun, or can be applied onto the sheet surface immediately after the antislip polymer has been sprayed thereon. The friction enhancing particles are thereby durably bonded by and with the sprayed on antislip polymer, and are at least partially embedded therein. Preferred friction enhancers are polymer particles, which may be waste grindings of the thermoplastic material of the base sheet, or particles of a third polymer distinct from that of the base sheet and that of the sprayed on material, such as polypropylene for example, or mixtures of different polymer particles.

The thermoset polymer, thermoplastic polymer, or combination thereof is selected to have a hardness in the finished product preferably in the range from a hardness greater than the underlying thermoplastic sheet to a hardness below that which is brittle and sharp, especially in products made according to the first method of the invention. The hardness may also be adjusted or selected as desired for different applications, by selecting an appropriate antislip polymer material or combination, by adjusting the blend of a thermoset antislip polymer as described above, and by adjusting the heat-treating time and temperature in the second method of the invention. For example the hardness may be in the durometer range from 40 Shore A to 70 Shore D within these constraints, with a most preferred range for many practical applications being 75 to 85 Shore A. Generally, in applications in which soft articles such as cardboard shipping cartons will be in frictional contact with the antislip surface, the antislip asperities preferably have a relatively higher hardness in the range from 70 Shore A to 70 Shore D. On the other hand, in applications in which hard items such as steel parts will be in frictional contact with the antislip surface, the asperities preferably have a relatively lower hardness in the range from 50 to 65 Shore A to achieve the best coefficient of friction. Also, in high abrasion applications, the hardness is preferably relatively higher. The antislip polymer can also have a hardness suitable for barefoot walking surfaces such as swimming pool surfaces etc.

The thermosetting, thermoplastic or combination polymer in liquid sprayable condition is formed into droplets and applied to the selected area to be prepared with an antislip surface. While this is accomplished by misting or spraying in the preferred example, the droplets can alternately be formed and applied by rolling or dripping through pin hole dispensers. As a further alternative, continuous or intermittent stripes or strings of the polymer can be extruded from nozzles onto the base sheet. Reference to the liquid sprayable condition is therefore intended to refer to a condition capable of being formed into droplets or into extruded stripes or islands by any means for application to the selected surface area.

As shown in FIG. 4, parts A and B of the thermosetting polymer are mixed at the spray head 36, which is preferably of the air-impingement opposing head type, and are then atomized and applied as a spray mist to the exposed cargo loading area 12 of HDPE sheet 10. The HDPE sheets 10 may be handled on a conveyor 40 while the sprayer is aligned overhead by a robotic arm 42. The spray head 36 is preferably operated at a spray pressure in the range from 1000 to 2000 psi, and at a distance in the range from 2.5 to 4.5 feet from the surface to be treated. These parameters are adjusted and controlled to deliver a fine mist of droplets having the desired size and coverage ratio, for a spray period that may last only a fraction of a second applying droplets of reacting polyurea polymer droplets on the exposed surface area 12. The reaction time of parts A and B may last from a few seconds to a few minutes according to the reactants. For slower reactions, the reaction time is preferably in the range of 20 seconds to a minute and for faster reactions the reaction time is in the range of 3–30 seconds. The reaction of the polyurea prepolymer and isocyanate is an exothermic reaction generating a spray temperature from exothermic heat alone in the range of for example 150° F. to 160° F. With the exothermic heat and air drying the droplets 18 harden on the selective surface area 12 in preparation for the subsequent thermoforming step according to the first method or the heat treating step according to the second method. Drying can be accelerated by application of supplemental heat.

Figure 5:
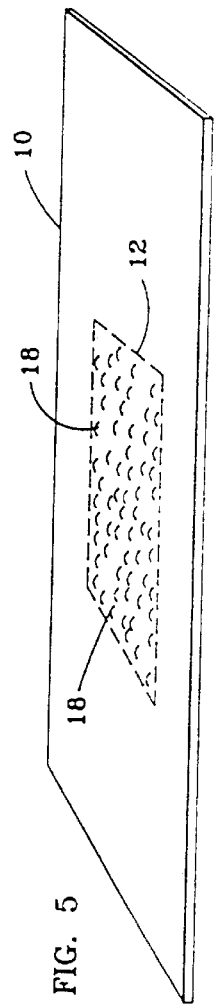
FIG. 5 is a diagrammatic perspective view of the HDPE sheet with a selected surface area with droplets applied thereon in preparation for thermoforming according to the first method of the invention, or heat treating according to the second method of the invention.

As shown in FIG. 5 the droplets 18 from the mist settle across the exposed surface area 12 to form a stippled pattern of rounded bumps with preliminary bonding to the HDPE plastic material. The temperature, spray pressure, spray distance, and spray duration from spray head 36 are controlled so that droplets in the size range of for example 2 mils-50 mils and preferably 5 mils-30 mils are applied to the exposed surface area 12 with the desired coverage ratio. The spray droplets agglomerate or overlap to some extent, so that the surfacial size (i.e. length and width dimensions) of bumps or asperities on the sheet is in the range of 2 mils to 90 mils, with the generally preferred bump size of most bumps being in the range from 10 mils to 50 mils. The height of the asperities is typically in the range from 2 mils to 40 mils, or may even be up to 55 mils.

It has been found to be desirable to control the asperity size and height for particular product applications. For applications such as medical and food handling and packaging (e.g. trays, totes and the like), in which uniformly supporting frictional contact with a hard flat surface such as glass is required, smaller bumps with a size in the range of 2 mils to 20 mils and a height in the range of 2 mils to 10 mils are preferred. Applications or surfaces such as pallet decks, wherein a soft article such as a corrugated cardboard carton will be in contact with the antislip surface, preferably have bumps in a medium size range of 10 or 20 mils to 50 mils and a height range from 5 or 10 mils to 30 mils. Applications such as pallet bottoms that are subject to high abrasion contact with a hard surface such as steel, especially with a load greater than 50 pounds per square inch whereby the asperities may become somewhat compressed, preferably have larger asperities in a size range from 20 or 50 mils to 90 mils and a height range from 10 or 30 mils to 40 mils.

The droplets are preferably applied with such a density so as to cover less than 50% of the surface area and leave exposed HDPE between the droplets 18. The droplet size shown in FIG. 5 is exaggerated. The area coverage ratio can also exceed 50%, for example up to 75% or 85%, with the key limitation being simply to avoid forming a continuous layer or film of the applied polymer material, and instead to preferably maintain non-interconnected islands or bumps of the polymer material. It may be desired in some situations to provide a coverage ratio and asperity shape that provide some overlapping interconnection, so as to form a network but not a continuous layer or film of the asperities. It has been found that low density coverage can be as effective and even more effective than higher density coverage. In the preferred embodiments, the droplets are therefore adjusted to cover substantially less than 50% of the exposed surface area. The generally preferred range of coverage is in a range from 15% to 60% for most applications, with the best cost effectiveness achieved with coverages in the range from 25% to 50% and especially 25% to 35% or up to 40%. High abrasion applications may preferably use coverage ratios over 50%.

Figure 5A:
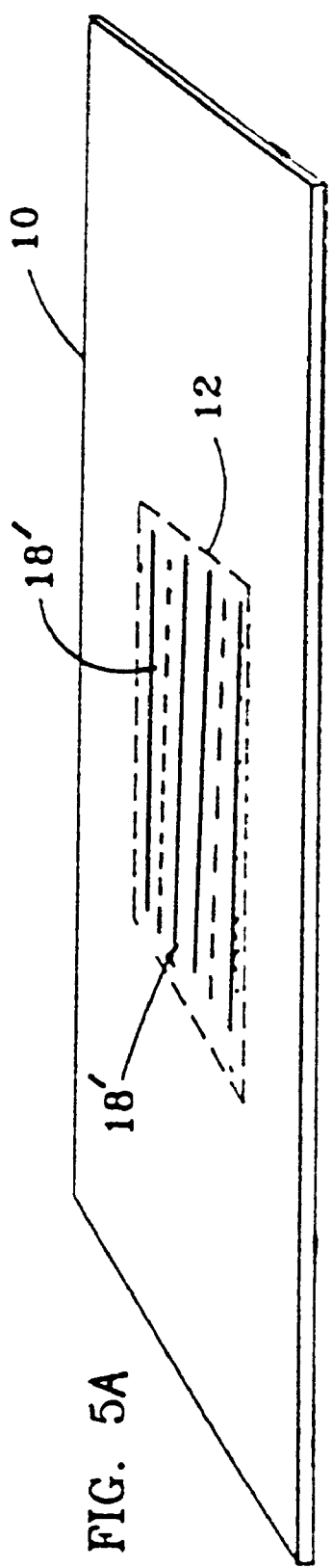
FIG. 5A is a diagrammatic perspective view similar to that of FIG. 5, but showing a selected surface area with stripes of antislip material applied thereon.

FIG. 5A shows an alternative embodiment wherein the asperities are long continuous or intermittent stripes or strings 18' that have been applied onto the base sheet from a plurality of extruder nozzles. The asperity heights, widths, coverage ratios, hardnesses, etc. as described herein regarding the droplet asperities also pertains to the extruded stripe asperities. The masking step is unnecessary if the extruder nozzles are used to apply the asperities to the precise areas as desired.

An advantage of the masking step used for the droplet spraying process is that the area to be treated can be any surface area in any desired shape or configuration. The process is not limited to any particular orientation or direction. If only a portion of the cargo area is to be treated with antislip properties, this can be readily accomplished at the masking step. Moreover, especially the second method can be carried out in two separate applications onto two distinct selected surface areas. In this manner, since the asperity properties are controllable, two distinct antislip areas having different antislip characteristics can easily be formed on the product surface. For example, it may be desired to provide a lower antislip coefficient of friction near the rear or tailgate area of a pickup bed liner to facilitate sliding of materials into and out of the cargo area, and a higher antislip coefficient of friction near the front of the bed liner to provide the highest slip resistance for items in this area. This can also be achieved by varying the spray parameters as the spray head moves over the area to be treated.

In FIG. 5 the mask has been removed and the HDPE sheet 10 is ready for thermoforming or heat-treating. As shown in FIG. 6 the HDPE sheet 10 is placed in a peripheral frame 50 which holds the edges of the HDPE sheet 10, especially for carrying out the first method. For the second method, the product with the treated surface is supported in any convenient manner for carrying out the heat treatment. As shown in the detailed illustration of FIG. 6A the HDPE sheet 10 with the specially prepared surface portion 12 is mounted in the frame 50 with the frame supporting the HDPE sheet 10 at its edges. The frame 50 is suspended from a track 52 for sliding into the thermoforming or heat-treating oven or furnace 54. Inside the oven 54 the HDPE sheet is heated to a proper temperature for the heat-treating of the second method or for thermoforming according to the first method.

In the second method, the heat-treating temperature is preferably in the range from 100° F. to 200° F. and is applied for a time in the range from 30 to 60 seconds. The temperature is preferably above 120° F. and just below the heat deflection temperature of the base thermoplastic. For heat-treating thin wall parts or critical dimension parts, the temperature is reduced and the heat treatment time is increased, so as to maintain product integrity. Also, the base product can be supported on a cooled metal support table or backup plate, to protect the base thermoplastic from deformation damage. Heating may be achieved by any means, such as so-called Calrod heaters, quartz heaters or catalytic gas heaters. Upon cooling to room temperature, the product according to the second method is finished.

For carrying out the first method, the HDPE sheet is heated in the oven 54 to temperatures typically in the range of 370° F.–400° F. although a broader temperature range of 250° F.–550° F. is applicable. The HDPE sheet 10 is typically heated on both sides by infrared radiant heaters over a period of, for example, three to four minutes until the sheet 10 is uniformly heated to the thermoforming temperature range and sags downward from the frame 50. The suitably heated and softened HDPE sheet 10 sagging from frame 50 is then delivered along the track 52 outside the oven over a thermoforming or vacuum forming mold 55. The mold 55 has suitable perforations or holes for application and distribution of vacuum across the sagging HDPE sheet 10.

As shown in detail in FIG. 6B, the frame 50 supporting the depending or sagging HDPE sheet 10 is lowered so that the frame 50 rests on top of vacuum forming mold 55 and the sagging HDPE sheet 10 is distributed near the vacuum forming surfaces of the mold 55. Next, the frame 50 is disassembled at the corners and removed over the sides of the mold 55. Then, the retention framework 56 is lowered on plungers 58 to engage and press the edges of the HDPE sheet 10 against the top rim of the mold 55 to hold the depending HDPE sheet 10 in place during the thermoforming process as shown in FIG. 7. Vacuum is then applied allowing atmospheric pressure to push the HDPE sheet 10 against the molding surfaces of the mold 55 to produce the truck bed liner 60 illustrated for example in FIG. 8. It is clear that the antislip surface in this case is on the side or surface of the sheet 10 facing away from the mold 55. Such a limitation of the first method of the invention does not apply to products formed by the second method, whereby the antislip treatment can be applied to any surface of the product, including surfaces that were in direct contact with a mold in the prior forming process.

Figure 8:
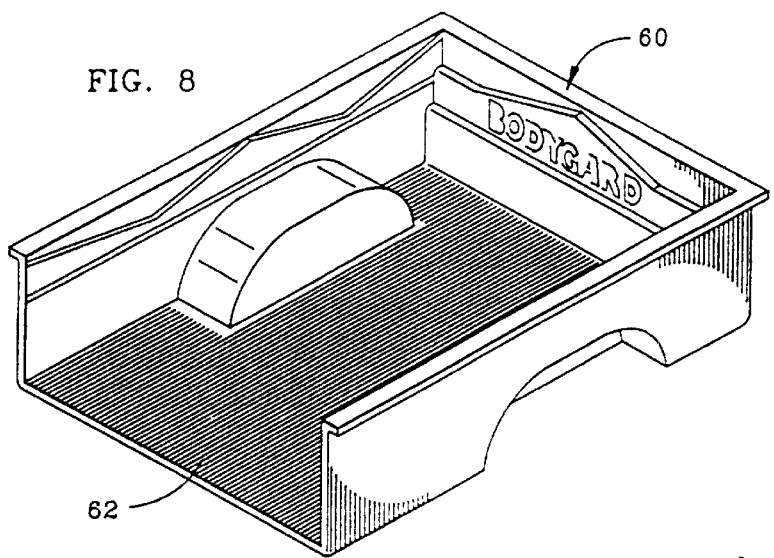
FIG. 8 is a diagrammatic perspective view of a pickup truck bed liner provided with an antislip surface according to the invention on a cargo carrying surface between the wheel wells.

The truck bed liner 60 shown in FIG. 8 has been trimmed after removal from the mold, cutting away excess plastic from the HDPE sheet and cutting away the tailgate liner portion (not shown) to be mounted on the tailgate of a pickup truck. The bed liner 60 is formed with a bottom portion or base 62. The portion of base 62 between the wheel wells coincides with the exposed surface area 12 of HDPE sheet 10 exposed by the mask 20. An antislip surface has thus been formed across the base 62 of the bed liner 60 between the wheel wells. The difference in appearance between the untreated HDPE and antislip surfaces is not visible from the distant vantage point of FIG. 8.

Figure 9:
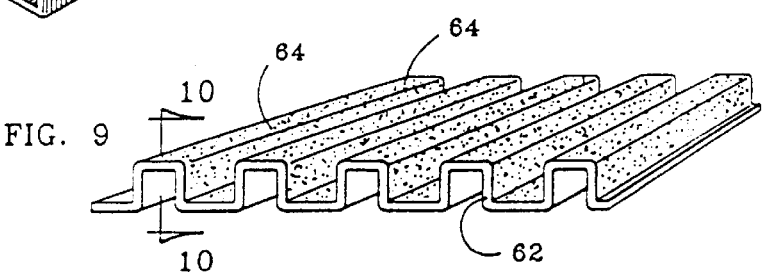
FIG. 9 is a detailed fragmentary perspective view of a portion of the antislip base of the bed liner.
Figure 10:
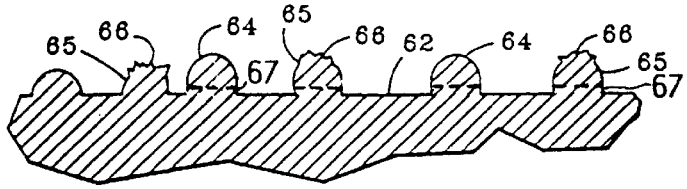
FIG. 10 is a diagrammatic cross sectional side view in the direction of arrows 10 of FIG. 9 schematically showing the characteristics of the droplet asperities especially as formed by the first or original method of the invention.

A portion of the base 62 between the wheel wells is shown in detail in FIG. 9 where pimples, bumps or asperities 64 are visible forming a stippled pattern across the base 62. The bumps or asperities 64 have a substantially hemispherical or domed shape and cover less than 50% of the surface area across the base 62 leaving exposed areas of the HDPE sheet between bumps. In this manner, the sprayed droplets 18 form substantially separated, non-connected and discontinuous bumps or pimples 64, wherein most of the bumps are separated from and do not contact or connect with adjacent bumps, as shown in FIGS. 9 and 10. Thus, individual islands of the sprayed-on polymer are formed on the base sheet, without forming a continuous or contiguous layer, film or mat of the antislip polymer. Even when some droplets overlap or coalesce, the overall result is a stippled pattern of non-contiguous asperities.

An advantage of the example thermosetting elastomeric polymer selected for use in preparing the antislip surface is that the favorable characteristics of the polymer are enhanced by the thermoforming process and the high temperatures of the thermoforming oven in the original method or the heat treatment in the alternative method. Specifically the adhesion promoter mixed with the polyurea prepolymer as well as the polyurea itself form durable bonds with the high density polyethylene molecules on the surface of the HDPE sheet. These bonds are as durable as the polyethylene itself and the bumps 64 cannot be removed from the base 62 of the bed liner without cutting the bumps. On the other hand prior to thermoforming, the droplets 18 sprayed on the exposed area 12 of the HDPE sheet 10, after a suitable drying time, can still be removed by abrasion. Furthermore, the thermoforming or heat treating process hardens the droplets 18 that make the bumps 64 to form asperities which give a high coefficient of friction over the cargo carrying surface.

The detailed cross-section of FIG. 10 schematically shows two features, namely the "volcano effect" and the "moth effect", that result in the antislip asperities formed according to the first method of the invention. The droplets 18 harden during the thermoforming process to form asperities 64 and 65 projecting from the base 62 of the bedliner 60. Some of the asperities 65 have polymerized on the surface of the base 62 with air or other gases evolved during polymerization entrapped therein. During thermoforming the entrapped gas expands and then bursts or erupts through the top of the bump 65 by the volcano effect, thereby forming craters with rough edges 56 which further enhance the coefficient of friction by about 5 to 10% across the cargo carrying surface. Another advantage of the craters, is that they will constantly provide rough edges as the asperities wear down. In other words, the asperities will not have a tendency to wear smooth over extended use. It has been noted that the asperities 64 formed by the second method may contain entrapped gas bubbles, but do not exhibit cratering due to the volcano effect.

Another advantage of the thermoforming process is the enhancement of relief across the treated surface area by the moth effect. As explained above, the applied droplets or bumps partially shade or screen the underlying base sheet of HDPE from the radiant heating that is applied for thermoforming. The resulting differential pattern of shading across the treated surface area causes a relatively greater flow, stretching and thinning of the areas of the HDPE sheet between droplets and a lesser flow, stretching and thinning of the areas of the HDPE sheet directly beneath the droplets during the thermoforming. The result is an enhancing of the relief and elevation of the droplet asperities or pimples 64 relative to the HDPE sheet. In FIG. 10, plateau 67 schematically represents the thicker or less-thinned areas of the surface of the HDPE sheet beneath the asperities 64 and 65, although the actual boundary between the antislip polymer of the droplets and the raised plateau of the base sheet material is difficult to determine precisely, due to the excellent mechanical, physical and molecular bonding across the boundary. Experiments and measurements have shown that under particular thermoforming conditions, the base sheet retains more or even all of its original thickness in the plateau areas directly beneath the asperities 64 and 65, while the areas of the sheet between the asperities are stretched and thinned to a degree depending upon the local degree of thermoforming that is carried out. As a result, the height of the asperities is increased by about 2 to 8 mils or especially about 4 to 5 mils relative to an asperity height without the moth effect plateau, and the plateau may extend for a small radius around each asperity, for example 1 to 3 mils. The resulting coefficient of friction is thus increased by about 8 to 12% for frictional contact against a softer article such as corrugated cardboard cartons.

FIGS. 11 to 15 are macrophotographs of sample materials treated according to the two processes of the invention, in order to illustrate various features or characteristics of the present antislip surfaces. All of the photographs show a scale in hundredths of an inch.

Figure 11:
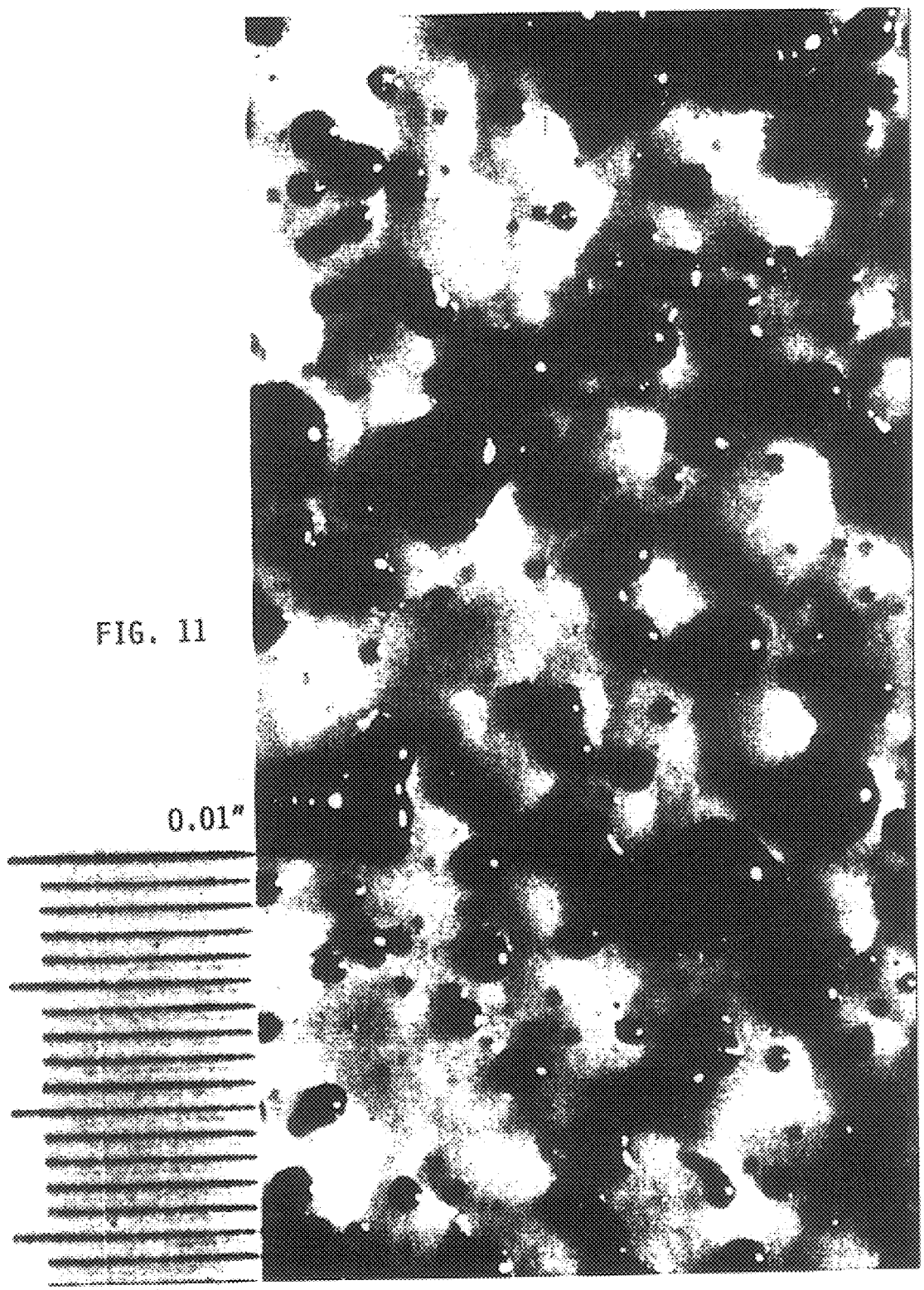
FIG. 11 is a macrophotograph showing a plan view of an antislip surface including thermoset polymer bumps or asperities durably bonded onto a HDPE base sheet according to the second or alternative method of the invention, and showing the scale of the photo in hundredths of an inch.

FIG. 11 is a top plan view photograph of a base sheet of white high density polyethylene with black antislip bumps or asperities of a preferred polyurea thermoset formed thereon according to the second method of the invention as described above. It should be noted that the white polyethylene base sheet shown in FIG. 11 has a bumpy or irregular grained surface texture as a previously existing feature of the polyethylene base sheet before application of the antislip asperities. It has been found that using base materials that initially already have a roughened or textured surface can further enhance the bonding of the asperities onto the base material, as discussed below. Thus, the surface appearance in FIG. 11 is not solely a result of the antislip treatment according to the invention. However, as discussed herein, the original method according to the present invention enhances the surface texture or surface relief at areas directly beneath the antislip bumps applied onto the surface of the base sheet.

FIG. 11 shows that the individual asperities have random amoeboid shapes, with length and width dimensions in a range from about 5 mils to about 80 mils. The asperities essentially include three different types of asperities. A first type of asperity is generally round in shape, has a size or diameter in a range from about 5 mils to 20 mils, and appears to be formed from an individual spray droplet. A second type of asperity also has a generally round shape, but a more irregular amoeboid outline than the first type of asperity, has a size in the range from about 25 mils to about 50 mils, and appears to be formed by a single large spray droplet or a plurality of droplets that coalesced together during spraying before impinging upon the base sheet. A third type of asperity has an irregular elongated shape with a width in the range from about 10 mils to about 20 mils, and a length of about 40 mils to about 80 mils. This third type of asperity appears to be formed by a plurality of spray droplets that have coalesced on the polyethylene base sheet after impinging thereon. It is believed that the presence of these three relatively distinct or distinguishable types of asperities contributes to the advantageous antislip character of the present antislip treated surface, because each type and size of asperity will have different antislip gripping or frictional characteristics on different articles that come in contact with the surface, as discussed above. For example, some of the asperities may provide good frictional characteristics relative to softer items in frictional contact therewith, and other ones of the asperities may provide good frictional characteristics relative to harder items in frictional contact therewith.

In the example of FIG. 11, an estimated measurement of the area coverage of the antislip asperities on the surface of the base sheet suggests that the coverage ratio is about 32 to 37%. It has been determined that an application of thermoset antislip polymer at the rate of about 4 grams per square foot of surface area results in a coverage ratio of about 30%, while maintaining asperity sizes within the preferred range. Application rates of about 3 grams per square foot to about 8 grams per square foot are preferred, with application rates of about 4 grams per square foot to about 6 grams per square foot being especially preferred. It is also apparent in FIG. 11 that at least 100 asperities per square inch will be provided. This can be calculated based on the above typical area coverage ratio of 30% and using a typical plan dimension of 30 mils of a single asperity. To achieve a linear coverage of 30%, representing 0.3 inches of asperity material intersected by a one inch line, requires 10 asperities per linear inch if each asperity has an average dimension of 0.03 inches (30 mils). Multiplying for an area coverage ratio gives 100 asperities per square inch.

Figure 12:
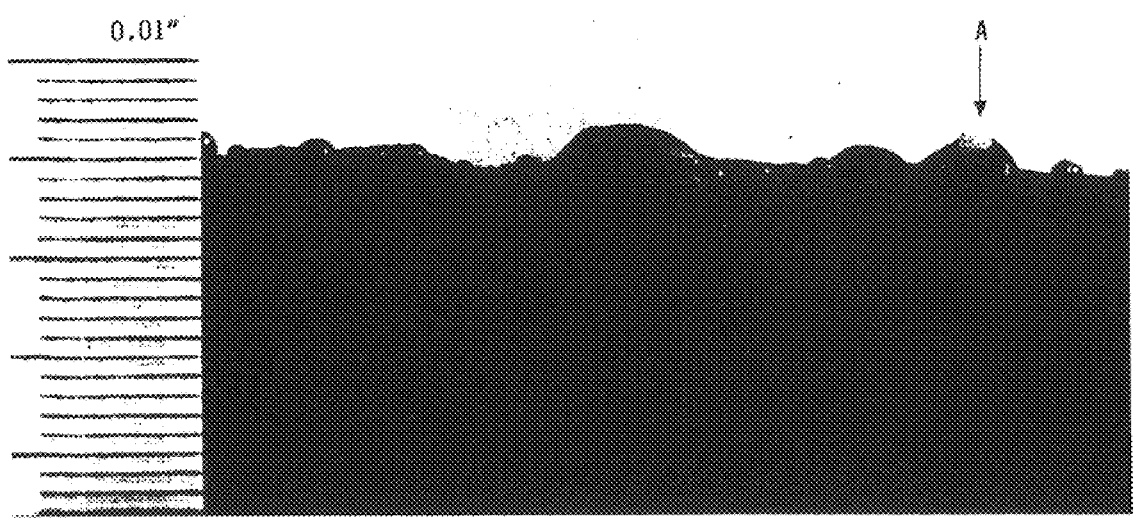
FIG. 12 is a macrophotograph showing a sectional or side view of a HDPE base sheet treated with an antislip surface formed according to the second or alternative method of the invention, and showing the scale of the photo in hundredths of an inch.

FIG. 11 further shows that some of the asperities contain bubbles of air or evolved gases, but those bubbles remain closed, i.e. have not erupted or burst open to cause cratering. Such bubbles are also shown, for example by arrow A, in the cross-sectional side view of FIG. 12, showing another sample prepared according to the second method of the invention (with only a heat treatment and without thermoforming after application of the antislip polymer). FIG. 12 further shows an asperity height in the range of about 5 mils to about 30 mils.

Figure 13:
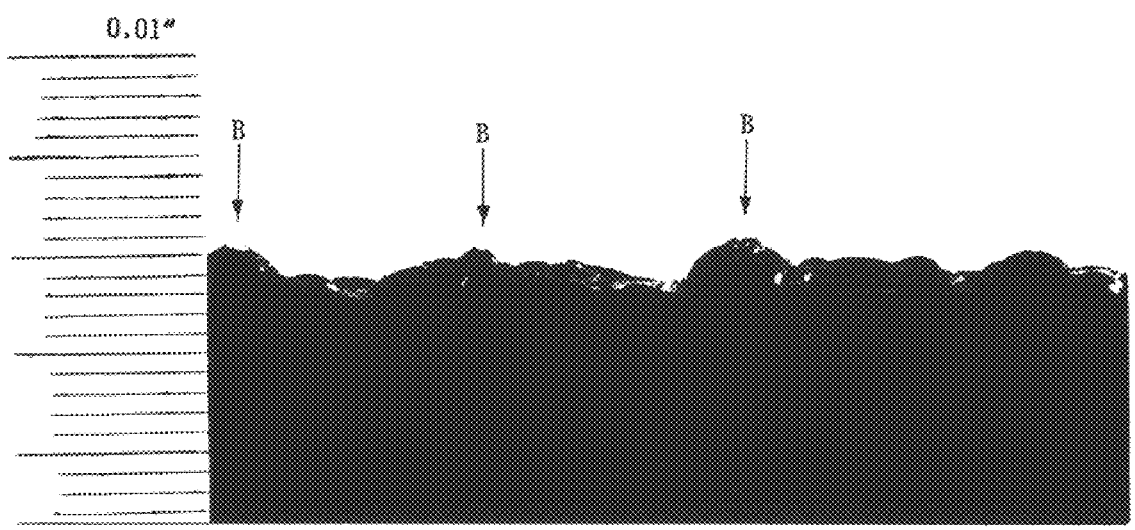
FIG. 13 is a macrophotograph showing a view similar to that of FIG. 12, but of an antislip surface formed according to the first or original method of the invention, and showing the scale of the photo in hundredths of an inch.
Figure 14:
FIG. 14 is a photographic enlargement of a detail portion of FIG. 13, showing a bump or asperity exhibiting a roughened crater caused by the "volcano effect" according to the first or original method of the invention.

In contrast to FIG. 12, FIG. 13 shows a sectional side view of a sample material prepared according to the first method of the invention, wherein the material was thermoformed after application of the droplets of antislip polymer. The arrows B in FIG. 13 clearly exhibit rough-edged craters caused by the so-called volcano effect that occurs during the thermoforming operation. FIG. 14 is a photographic enlargement of one of the asperities exhibiting a volcano effect crater in FIG. 13. The rough edges around the rim of the crater increase the coefficient of friction provided by the antislip surface asperities.

FIG. 15 shows an elevated perspective side view of a sample prepared by applying a black polyurea thermoset composition onto a white polyethylene base sheet according to the second method of the invention. As shown by arrows C and D, the adhesion or bonding of the antislip polymer onto the polyethylene base sheet is enhanced by a mechanical penetration and interbonding of the antislip polymer into any surface irregularities on the original surface of the polyethylene base sheet, and possibly also by a physical interblending of the two materials.

In order to quantitatively evaluate the frictional characteristics of the inventive antislip surface, four different samples having an antislip surface according to the invention and a control material were prepared, and the static and kinetic coefficients of friction thereof were measured. The control material was a four inch by fourteen inch sheet of high density polyethylene in an untreated or "as is" condition. Four samples (Samples A, B, C, and D) were prepared by spraying droplets of a two-part thermoset mixture of Part A 4, 4-diphenylmethane-diisocyanate and Part B di-(methio) toluenediamine onto respective four by fourteen inch sample substrates of high density polyethylene sheets, and then heat treating the substrates with the droplets thereon at a temperature of about 170° F., according to the second or alternative method of the invention. The spraying air pressure and air ratio in the spray gun were adjusted to achieve desired droplet and asperity sizes and heights and coverage. The thermoset B:A ratio and the heat treatment temperature were adjusted as necessary for achieving the desired hardness of the asperities. The following Table 1 shows the thermoset B:A component ratio, the asperity size (width and length), the asperity height, and the asperity hardness for each of the samples A, B, C, and D.

TABLE 1

| | SAMPLE CHARACTERISTICS | | | |
|---|---|---|---|---|
| SAMPLE | THERMO-SET B:A RATIO | ASPERITY SIZE | ASPERITY HEIGHT | ASPERITY HARDNESS |
| SAMPLE A | 1:1 | 0.002"–0.050" | 0.002"–0.030" | 50–60 Shore A |
| SAMPLE B | 2:1 | 0.002"–0.050" | 0.002"–0.030" | 70–80 Shore A |
| SAMPLE C | 2:1 | 0.002"–0.050" | 0.002"–0.030" | 50–70 Shore D |

TABLE 1-continued

SAMPLE CHARACTERISTICS

| SAMPLE | THERMO-SET B:A RATIO | ASPERITY SIZE | ASPERITY HEIGHT | ASPERITY HARDNESS |
|---|---|---|---|---|
| SAMPLE D | 1:1 | 0.002"–0.090" | 0.002"–0.040" | 50–60 Shore A |

As is evident from Table 1, it is readily possible to prepare products having desired asperity sizes and heights, for example in two categories as shown in Table 1, and different asperity hardness levels, for example in three categories as shown in Table 1, to match requirements for different applications, by simply adjusting the process components and parameters as discussed above.

Coefficient of friction testing was carried out according to ASTM D1894–95 with the static coefficient of friction based on the maximum load at the first peak, and the kinetic coefficient of friction based on the average load after the first peak, tested at ambient conditions of 40% humidity and 69° F. temperature, with testing machine parameters of a sample rate of 10 pts/sec and a crosshead speed of 6 in/min. Prior to testing the samples were preconditioned for at least 24 hours at 23±2° C. and 50±5% relative humidity. For each one of the samples A, B, C, and D, and the non-treated control, the static and kinetic coefficients of friction were measured as an average value of 5 test specimens for each sample. Samples A, B, and C were each tested for frictional abrasion or sliding relative to a countersurface of box grade corrugated cardboard with the corrugation flutes oriented parallel to the direction of abrasion or sliding. Sample D was tested for frictional abrasion or sliding relative to a countersurface of cold rolled steel. The control sample of untreated high density polyethylene was tested relative to both the corrugated cardboard and the cold rolled steel countersurfaces.

Following Table 2 summarizes the results of the tests, showing the static coefficient of friction, the kinetic coefficient of friction, and the average multiplier or increase in the coefficient of friction for the samples according to the invention relative to the untreated polyethylene control.

From the results in Table 2 it can be seen that while the static coefficient of friction of the control (plain HDPE) relative to corrugated cardboard is only about 0.34, the static coefficient of friction of the inventive samples relative to corrugated cardboard was in the range of 0.98 to 1.04, when averaged over the five test specimens. Evaluating the test specimens individually, it is considered that the static coefficient of friction of the present embodiment of the inventive antislip surface relative to a corrugated cardboard surface is in the range of 0.9 to 1.09, with a more preferred range for most applications being 0.98 to 1.04. The kinetic coefficient of friction of the inventive samples relative to a corrugated substrate was in the range of 0.83 to 0.89 when averaged over the five test specimens. Evaluated individually, the test results show a kinetic coefficient of friction of the inventive antislip surface relative to corrugated cardboard in the range of 0.77 to 0.96, with a more preferred range for most applications being 0.8 or especially 0.83 to 0.89.

From Table 2, it is also apparent that the inventive antislip surface increases the coefficient of friction relative to an untreated polyethylene surface by at least 3 times and particularly 3.2 to 3.3 times, when considering the static coefficient of friction and kinetic coefficient of friction averaged together. It is also evident that the inventive surface increases the kinetic coefficient of friction even more than the static coefficient of friction, namely an increase of about 3.5 to 3.7 times the untreated polyethylene coefficient of friction, as compared to an increase of 2.9 to 3.1 times for the static coefficient of friction. It is believed that the special form and other properties of the present asperities contribute especially to the improvement of the kinetic coefficient of friction, namely once an article starts sliding on the present antislip surface, the irregular and relatively engaging edges of the asperities serve to grab onto the sliding article. The results in Table 2 also show that Sample B having asperities with a medium hardness provides the best static coefficient of friction while Sample A having the softest asperities provides the best kinetic coefficient of friction relative to cardboard surfaces in the present example. These results can be taken into account when selecting the proper characteristics for a given application.

The results in Table 2 relating to the coefficient of friction relative to cold rolled steel demonstrate a very great increase of 4.9 times the kinetic coefficient of friction of an untreated control sheet of polyethylene, and 4.2 times the static

TABLE 2

COEFFICIENT OF FRICTION RESULTS

| SAMPLE/ COUNTER SURFACE | STATIC COEFFI- CIENT OF FRICTION | INCREASE IN STATIC COEFFI- CIENT OF FRICTION | KINETIC COEFFICIENT OF FRICTION | INCREASE IN KINETIC COEFFICIENT OF FRICTION | AVERAGE INCREASE IN COEFFICIENT OF FRICTION |
|---|---|---|---|---|---|
| CONTROL/ CARDBOARD | 0.34 | — | 0.24 | — | — |
| SAMPLE A/ CARDBOARD | 0.98 | 2.9x | 0.89 | 3.7x | 3.3x |
| SAMPLE B/ CARDBOARD | 1.04 | 3.1x | 0.85 | 3.5x | 3.3x |
| SAMPLE C/ CARDBOARD | 0.98 | 2.9x | 0.83 | 3.5x | 3.2x |
| CONTROL/ STEEL | 0.18 | — | 0.14 | — | — |
| SAMPLE D/ STEEL | 0.75 | 4.2x | 0.68 | 4.9x | 4.5x | coefficient of friction of the untreated control sheet. Evaluating the test specimens individually, the static coefficient of friction was in a range from 0.60 to 0.80, with a more preferred range for most applications being in the range of 0.70 to 0.76. The kinetic coefficient of friction as shown by the samples was in the range of 0.62 to 0.77, with a more preferred range for most applications being 0.65 to 0.75.

Two different samples, one prepared according to the first or original method of the invention and one prepared according to the second or alternative method of the invention, were subjected to abrasion testing to determine the wear resistance and durability of the bonding of the antislip asperities on the base material. Both Samples E and F were prepared by spraying droplets of the preferred two component polyurea/isocyanate thermoset polymer onto respective four inch by four inch base sheets of high density polyethylene. The process conditions for forming the samples and the antislip asperity characteristics are shown in the following Table 3.

TABLE 3

SAMPLE CHARACTERISTICS

| SAMPLE | THERMOSET B:A RATIO | PROCESSING CONDITIONS | ASPERITY SIZE | ASPERITY HEIGHT | ASPERITY HARDNESS |
|---|---|---|---|---|---|
| SAMPLE E | 2:1 | FIRST METHOD - after application of thermoset droplets, the sample was heated to about 350° F. and then thermoformed | 0.002"–0.050" | 0.002"–0.030" | 70–80 Shore A |
| SAMPLE F | 2:1 | SECOND METHOD - after application of thermoset droplets, the sample was heat treated at about 170° F. (and not thermoformed) | 0.002"–0.050" | 0.002"–0.030" | 70–80 Shore A |

The abrasion testing conducted on each of the Samples E and F was a Taber abrasion test according to ASTM D1044. Each test sample was abraded using an H-18 abrasive wheel under a 500 gram load, while spinning at a speed of 70 r.p.m. for a total of 10,000 cycles. Prior to the testing, the samples had been pre-conditioned for at least 24 hours at 23±2° C. and 50±5% relative humidity. Both samples showed remarkable wear resistance and durability of the bond between the asperities and the polyethylene base sheet. Specifically, both samples showed some evidence of wear, but not down to the polyethylene base material. There was no visible evidence of separation or removal of asperities from the base sheet due to a failure of the bond therebetween. In each case, the abrasion wheel itself was substantially worn and deteriorated through the testing. As a result, it is considered preferable if the antislip asperities can withstand at least 5000 cycles and especially at least 8000 cycles of such an abrasion test.

It was also reported that similar abrasion tests on ordinary, untreated thermoplastics such as polyethylene show substantial abrasive wear of the polyethylene material after significantly fewer than 10,000 cycles, e.g. fewer than 1000 cycles. Also, a similar abrasion test of polypropylene fibers sprayed onto a polypropylene sheet, without heat treatment or thermoforming according to the present invention, resulted in severe abrasion and wear of the polypropylene fibers. Namely, the sample was worn down to the polypropylene base material within 1000 cycles. It has also been noted that even the antislip asperity polymers according to the invention, when applied to a polyethylene base sheet without further processing according to the first or second methods of the invention, are not durably bonded onto the polyethylene and are thus relatively easily scraped or abraded off of the base sheet.

The present test results demonstrate that the antislip asperities applied onto a thermoplastic base sheet and treated according to either the first method or the second method of the invention substantially improve the wear resistance as compared to an untreated base sheet. Furthermore, the present results demonstrate that antislip asperities applied onto a thermoplastic base material and further processed according to the first or second method of the invention are very durably bonded onto the base material, apparently to the extent of an integral, unitary bond between the applied antislip polymer and the thermoplastic base sheet.

As discussed above, either the first or the second process for selectively forming antislip surfaces can be applied to a variety of thermoformed and non-thermoformed products including flat configuration truck bed mats and slip sheets. The antislip surfaces can be formed selectively in the same manner as described with reference to the truck bed liner or across the entire surface of the truck bed mat or slip sheet. In the case of a flat configuration truck bed mat or slip sheet, the sheet may still be thermoformed, according to the first method, on a vacuum molding surface with a shallow well to cause the enhanced relief of asperities formed by the droplets across the surface. In the application of the first method of the invention to flat surface products, an undersize HDPE sheet or other thermoplastic sheet is used and the product portion to be treated is vacuum formed in the shallow well to cause the differential thinning with enhanced asperities and surface relief for increased coefficient of friction. The flat product portion is then cut away from the thermoformed plastic sheet. Alternatively, such flat products are treated according to the second method of the invention.

The two processes of the invention can also be used for selectively forming antislip surfaces on a variety of other thermoplastic products including recreational products, such as slide bars, which require a low coefficient of friction slippery bottom but a high coefficient of friction antislip or nonskid top surface. Other applications include antislip walking surfaces and soles or heels of shoes such as the heels of bowling shoes.

Another application of the processes is in providing antislip surfaces on swimming pool surfaces, walkways, and stairs, and shower, bathtub and bathroom surfaces made of ABS plastic or other thermoplastics. The antislip surface provides an ideal surface for human bare feet, imparting antislip properties with a high coefficient of friction and without unnecessary abrasion, brittleness, or cutting. The invention can also be used for application on other barefoot walking surfaces, and particularly wet surface areas.

While the invention has been described with reference to particular example embodiments, it is intended to cover all modifications and equivalents within the scope of the following claims. Furthermore, the disclosure of the invention includes all combinations of any two or more features recited in any of the following claims. The disclosure also covers all intermediate points within any range that is expressly referred to herein.

What is claimed is:

1. A plastic article of manufacture having an antislip surface, comprising:
   a base member comprising a polyolefin thermoplastic polymer material, and
   a plurality of asperities comprising an antislip polymer that comprises a polyurea-based polymer applied and durably bonded directly onto a surface of said base member over at least a selected surface area thereof so as to form a direct intimate bond between said antislip polymer of said asperities and said polyolefin thermoplastic polymer material of said base member,
   wherein said asperities are separate from one another to such an extent so as to leave a portion of said surface of said base member exposed between said asperities and so as not to form a continuous film of said antislip polymer over said selected surface area of said base member,
   wherein at least some of said asperities have respective substantially circular shapes and at least others of said asperities have respective unique non-uniform amoeboid shapes, in a plane of said selected surface area, as formed by spraying droplets of said antislip polymer onto said surface of said base member, and
   wherein said asperities provide a relatively increased coefficient of friction over said selected surface area in comparison to a base coefficient of friction of said base member without said asperities.

2. The article of manufacture according to claim 1, wherein said asperities comprise individual non-interconnected asperities separately arranged so as to leave said base member exposed completely around individual ones of said asperities.

3. The article of manufacture according to claim 1, wherein said asperities are non-interconnected so as not to form a continuous interconnected network of said asperities over said selected surface area of said base member.

4. The article of manufacture according to claim 1, wherein said asperities cover in a range from 20% to 60% of said surface of said base member over said selected surface area, and said portion of said surface that is exposed between said asperities over said selected surface area is correspondingly in a range from 80% to 40%.

5. The article of manufacture according to claim 1, wherein respective ones of said asperities have respective craters in surfaces thereof with rough crater edges directed generally away from said base member.

6. The article of manufacture according to claim 5, wherein said craters and said rough crater edges are of such a character as is formed by bursting gas-entrapping bubbles within said respective asperities during formation thereof.

7. The article of manufacture according to claim 1, wherein said asperities have lateral dimensions in a plane of said selected surface area in a range from 2 mils to 90 mils, and height dimensions protruding from said surface of said base member in a range from 2 mils to 55 mils.

8. The article of manufacture according to claim 1, wherein said relatively increased coefficient of friction provided by said asperities over said selected surface area is at least 0.7 when measured relative to a plain cold-rolled steel surface.

9. The article of manufacture according to claim 1, wherein said relatively increased coefficient of friction provided by said asperities over said selected surface area is a static coefficient of friction of at least 0.98 when measured relative to a plain box-grade cardboard surface.

10. The article of manufacture according to claim 1, wherein said relatively increased coefficient of friction provided by said asperities over said selected surface area is a kinetic coefficient of friction of at least 0.89 when measured relative to a plain box-grade cardboard surface.

11. The article of manufacture according to claim 1, wherein said relatively increased coefficient of friction is at least 4 times said base coefficient of friction under dry conditions.

12. The article of manufacture according to claim 1, wherein said asperities are sufficiently wear resistant and sufficiently durably bonded onto said base member to withstand at least 5000 cycles in a Taber abrasion test according to ASTM D1044 with an H-18 abrasive wheel under a 500 gram load, without removing said asperities and without abrading said asperities down to said base member.

13. The article of manufacture according to claim 1, wherein said polyurea-based thermoset polymer comprises a hybrid polyurea polyurethane polymer.

14. The article of manufacture according to claim 13, wherein polyurea predominates over polyurethane in said hybrid polyurea polyurethane polymer.

15. The article of manufacture according to claim 1, wherein said polyurea-based thermoset polymer is prepared from a polyurea prepolymer and an isocyanate.

16. The article of manufacture according to claim 1, wherein said polyurea-based thermoset polymer is prepared using a toluenediamine and a diisocyanate.

17. The article of manufacture according to claim 1, wherein said polyolefin thermoplastic polymer material comprises polyethylene.

18. The article of manufacture according to claim 1, wherein said polyolefin thermoplastic polymer comprises high density polyethylene, said base member comprises a solid extruded or molded layer of said polyethylene, said asperities essentially consist of said antislip polymer, and said antislip polymer essentially consists of said polyurea-based thermoset polymer.

19. The article of manufacture according to claim 1, wherein an area density of said asperities is at least 100 asperities per square inch of said selected surface area, and an application rate of said asperities is in a range from 4 to 6 grams of said asperities per square foot of said selected surface area.

20. The article of manufacture according to claim 1, wherein said article is a shipping pallet, wherein said base member comprises a top pallet deck, at least two fork engagement channels arranged under said top pallet deck, and at least one footprint surface at a bottom of said base member, and wherein said selected surface area over which said asperities are provided includes respective areas on said top pallet deck, said fork engagement channels and said footprint surface.

* * * * *